US010637882B2

(12) United States Patent
Gorodissky et al.

(10) Patent No.: US 10,637,882 B2
(45) Date of Patent: *Apr. 28, 2020

(54) PENETRATION TESTING OF A NETWORKED SYSTEM

(71) Applicant: XM Ltd., Hertzelia (IL)

(72) Inventors: Boaz Gorodissky, Hod-Hasharon (IL); Adi Ashkenazy, Tel Aviv (IL); Ronen Segal, Hertzelia (IL)

(73) Assignee: XM Cyber Ltd., Hertsliya (IL)

( * ) Notice: Subject to any disclaimer, the term of this patent is extended or adjusted under 35 U.S.C. 154(b) by 203 days.

This patent is subject to a terminal disclaimer.

(21) Appl. No.: 15/874,429

(22) Filed: Jan. 18, 2018

(65) Prior Publication Data

US 2018/0219904 A1 Aug. 2, 2018

Related U.S. Application Data

(60) Provisional application No. 62/451,850, filed on Jan. 30, 2017.

(51) Int. Cl.
*H04L 29/06* (2006.01)
*H04L 12/26* (2006.01)
*H04L 12/24* (2006.01)

(52) U.S. Cl.
CPC .......... *H04L 63/1433* (2013.01); *H04L 43/50* (2013.01); *H04L 63/20* (2013.01); *H04L 63/30* (2013.01); *H04L 41/048* (2013.01)

(58) Field of Classification Search
CPC ..... H04L 63/1433; H04L 43/50; H04L 63/30; H04L 63/1466; H04L 63/1408;
(Continued)

(56) References Cited

U.S. PATENT DOCUMENTS 6,952,779 B1 * 10/2005 Cohen .................. G06F 21/577
726/22
7,013,395 B1 * 3/2006 Swiler ................. H04L 63/1433
713/151
(Continued)

FOREIGN PATENT DOCUMENTS

CN 103200230 A 7/2013
CN 104009881 A 8/2014
(Continued)

OTHER PUBLICATIONS

CN103200230 Machine Translation (by EPO and Google) published Jul. 10, 2013 Li Qianmu.
(Continued)

*Primary Examiner* — Trang T Doan
(74) *Attorney, Agent, or Firm* — Marc Van Dyke; Momentum IP Group

(57) ABSTRACT

Methods and systems for penetration testing of a networked system comprising a set of network-nodes by a penetration testing system (e.g. to enforce first and/or second rules) are disclosed herein. The penetration testing system comprises: (i) reconnaissance agent software module (RASM) installed on multiple nodes (each of which is a RASM-hosting node) of the networked system to be penetration-tested and (ii) a penetration testing software module (PTSM) installed on a remote computing device (RCD). Internal data from each of the RASM-hosting nodes is collected and transmitted to the RCD. Analysis of the internal data collected from multiple RASM-hosting network nodes determines a method for an attacker to compromise the networked system. The first and second rules are defined herein. Alternatively or additionally, one or more of the RASM instances are pre-installed on one or more RASM-hosting nodes before the penetration testing commences.

20 Claims, 17 Drawing Sheets

(58) Field of Classification Search
CPC ........... H04L 63/1475; H04L 2463/102; H04L 63/1425; G06F 21/55
See application file for complete search history.

(56) References Cited

U.S. PATENT DOCUMENTS

| | | | |
|---|---|---|---|
| 7,757,293 B2 | 7/2010 | Caceres et al. | |
| 8,001,589 B2* | 8/2011 | Ormazabal | H04L 63/02 726/11 |
| 8,112,016 B2* | 2/2012 | Matsumoto | G03G 15/0877 399/102 |
| 8,127,359 B2* | 2/2012 | Kelekar | H04L 63/1408 726/25 |
| 8,356,353 B2* | 1/2013 | Futoransky | H04L 63/1433 726/25 |
| 8,365,289 B2* | 1/2013 | Russ | H04L 63/1433 713/188 |
| 8,490,193 B2* | 7/2013 | Sarraute Yamada | H04L 41/0823 709/206 |
| 8,650,651 B2* | 2/2014 | Podjarny | G06F 21/577 709/224 |
| 8,813,235 B2* | 8/2014 | Sidagni | G06F 21/577 713/189 |
| 9,076,013 B1* | 7/2015 | Bailey, Jr. | G06F 21/6227 |
| 9,183,397 B2 | 11/2015 | Futoransky et al. | |
| 9,224,117 B2* | 12/2015 | Chapman | G06Q 10/0635 |
| 9,270,696 B2* | 2/2016 | Fritzson | G06F 21/577 |
| 9,276,952 B2* | 3/2016 | Simpson | G06F 21/577 |
| 9,292,695 B1* | 3/2016 | Bassett | G06F 21/577 |
| 9,350,753 B2* | 5/2016 | Kaplan | H04L 63/1433 |
| 9,473,522 B1* | 10/2016 | Kotler | H04L 63/1433 |
| 9,558,355 B2* | 1/2017 | Madou | H04L 63/1433 |
| 2005/0086502 A1* | 4/2005 | Rayes | H04L 63/20 713/189 |
| 2007/0204347 A1* | 8/2007 | Caceres | H04L 63/1433 726/25 |
| 2008/0209567 A1* | 8/2008 | Lockhart | G06F 11/3612 726/25 |
| 2008/0288822 A1* | 11/2008 | Wu | G06F 21/577 714/32 |
| 2009/0044277 A1 | 2/2009 | Aaron | |
| 2009/0172813 A1* | 7/2009 | Aaron | H04L 63/1408 726/22 |
| 2010/0138925 A1* | 6/2010 | Barai | H04L 63/1433 726/25 |
| 2011/0035803 A1* | 2/2011 | Lucangeli Obes | G06F 21/577 726/25 |
| 2012/0174228 A1* | 7/2012 | Giakouminakis | H04L 63/1441 726/25 |
| 2013/0014263 A1 | 1/2013 | Porcello et al. | |
| 2013/0031635 A1 | 1/2013 | Lotem et al. | |
| 2014/0173739 A1* | 6/2014 | Ahuja | G06F 21/577 726/25 |
| 2014/0237606 A1* | 8/2014 | Futoransky | G06F 21/577 726/25 |
| 2016/0044057 A1* | 2/2016 | Chenette | H04L 63/1433 726/1 |
| 2016/0234251 A1* | 8/2016 | Boice | H04L 63/20 |
| 2016/0248800 A1* | 8/2016 | Ng | H04L 63/20 |
| 2016/0275289 A1* | 9/2016 | Sethumadhavan | G06F 21/552 |
| 2016/0342796 A1* | 11/2016 | Kaplan | H04L 63/1433 |
| 2016/0352771 A1* | 12/2016 | Sivan | H04L 63/1433 |
| 2017/0063886 A1* | 3/2017 | Muddu | G06F 3/0484 |
| 2017/0098086 A1* | 4/2017 | Hoernecke | G06F 21/577 |
| 2017/0116421 A1* | 4/2017 | Chandan | G06F 16/23 |
| 2017/0279843 A1* | 9/2017 | Schultz | H04L 63/1433 |
| 2018/0046811 A1* | 2/2018 | Andriani | G06F 21/577 |

FOREIGN PATENT DOCUMENTS

| | | |
|---|---|---|
| CN | 103916384 A | 4/2017 |
| EP | 1559008 A1 | 4/2017 |
| WO | WO0038036 A2 | 4/2017 |
| WO | WO2010069587 A1 | 4/2017 |
| WO | WO2013087982 A1 | 4/2017 |
| WO | WO2015111039 A1 | 4/2017 |
| WO | WO2016164844 A1 | 4/2017 |

OTHER PUBLICATIONS

CN103916384 Machine Translation (by EPO and Google) published on Apr. 6, 2017 Zhong et al.
CN104009881 Machine Translation (by EPO and Google) published on Aug. 27, 2014 Wang et al.

* cited by examiner providing a reconnaissance agent software module for installing on multiple network nodes of the plurality of network nodes, wherein the reconnaissance agent software module is operable, when installed on a network node, to do at least: (i) receive instructions from a remote computing device, (ii) transmit data to a remote computing device, (iii) collect data about at least one of: (A) internal events occurring in the network node, (B) internal conditions existing in the network node, (C) internal facts about the network node

providing a remote computing device penetration testing software module for installing on a remote computing device, the remote computing device being operable to communicate with at least one of the multiple network nodes on which the reconnaissance agent software module is installed

sending at least one command from the remote computing device to a group of one or more of the multiple network nodes on which the reconnaissance agent software module is installed, the at least one command instructing the reconnaissance agent software module installed on each member of the group to provide data about at least one of: (i) an internal event occurring in the each member of the group, (ii) an internal condition existing in the each member of the group, and (iii) an internal fact about the each member of the group, wherein the at least one command originates in the remote computing device penetration testing software module

FIG. 10A

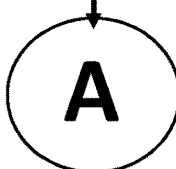

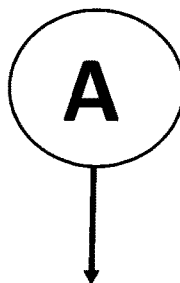

for each network node in the group of one or more network nodes:

executing code of the reconnaissance agent software module by a processor of the each network node, the code collecting data about at least one of: (A) an internal event occurring in the each network node, (B) an internal condition existing in the each network node, and (C) an internal fact about the each network node, wherein the executing code of the reconnaissance agent software module is done without compromising the networked system sending at least one message from the each network node to the remote computing device, the at least one message containing the data collected by the each network node, wherein the at least one message originates in the reconnaissance agent software module installed on the each network node, wherein the at least one message is sent in response to the sending at least one command

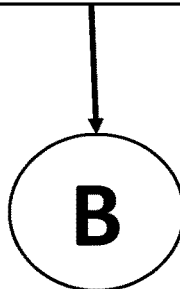

FIG. 10B providing a reconnaissance agent software module for installing on multiple network nodes of the plurality of network nodes, wherein the reconnaissance agent software module is operable, when installed on a network node, to do at least: (i) receive instructions from a remote computing device, (ii) transmit data to a remote computing device, (iii) collect data about at least one of: (A) internal events occurring in the network node, (B) internal conditions existing in the network node, (C) internal facts about the network node

providing a remote computing device penetration testing software module for installing on a remote computing device, the remote computing device being operable to communicate with at least one of the multiple network nodes on which the reconnaissance agent software module is installed

sending at least one command from the remote computing device to a group of one or more of the multiple network nodes on which the reconnaissance agent software module is installed, the at least one command instructing the reconnaissance agent software module installed on each member of the group to provide data about at least one of: (i) an internal event occurring in the each member of the group, (ii) an internal condition existing in the each member of the group, and (iii) an internal fact about the each member of the group, wherein the at least one command originates in the remote computing device penetration testing software module, wherein the sending at least one command is done when the reconnaissance agent software module is already installed on each network node in the group of one or more network nodes

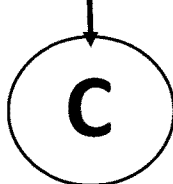

FIG. 11A

PENETRATION TESTING OF A NETWORKED SYSTEM

CROSS-REFERENCE TO RELATED APPLICATIONS

This patent application claims the benefit of U.S. Provisional Patent Application No. 62/451,850 filed on Jan. 30, 2017, which is incorporated herein by reference in its entirety.

BACKGROUND

A Discussion of FIGS. 1A-1C, 2-3

There is currently a proliferation of organizational networked systems. Every type of organization, be it a commercial company, a university, a bank, a government agency or a hospital, heavily relies on one or more networks interconnecting multiple computing nodes. Failures of the networked system of an organization or even of only a portion of it might cause a significant damage, up to completely shutting down all operations. Additionally, much of the data of the organization (and for some organizations even all data) exists somewhere on its networked system, including all confidential data comprising its "crown jewels" such as prices, details of customers, purchase orders, employees' salaries, technical formulas, etc. Loss of such data or leaks of such data to outside unauthorized entities might be disastrous for the organization.

Many organizational networks are connected to the Internet at least through one network node, and consequently they are subject to attacks by computer hackers or by hostile adversaries. Even an organizational network that is not connected to the Internet might be attacked by an employee of the organization. Quite often the newspapers are reporting incidents in which websites crashed, sensitive data was stolen or service to customers was denied, where the failures were the results of hostile penetration into an organization's networked system.

Thus, many organizations invest a lot of efforts and costs in preventive means designed to protect their networked systems against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISO's (Computer Information Security Officers) will admit (maybe only off the record), that they don't really know how well they can withstand an attack from a given adversary. The only way to really know how strong and secure a networked system is, is by trying to attack it as a real adversary would. This is known as penetration testing (pen testing, in short), and is a very common approach that is even required by regulation in some developed countries.

Penetration testing requires highly talented people to man the testing team. Those people should be familiar with each and every known security vulnerability and attacking method and should also have a very good familiarity with networking techniques and multiple operating systems implementations. Such people are hard to find and therefore many organizations give up establishing their own penetration testing teams and resort to hiring external expert consultants for carrying out that role (or completely give up penetration testing). But external consultants are expensive and therefore are typically called in only for brief periods separated by long time intervals in which no such testing is done. This makes the penetration testing ineffective as security vulnerabilities caused by new forms of attacks that appear almost daily are discovered only months after becoming serious threats to the organization.

Additionally, even rich organizations that can afford hiring talented experts for in-house penetration testing teams do not achieve good protection. Testing for security vulnerabilities of a large networked system containing many types of computers, operating systems, network routers and other devices is both a very complex and a very tedious process. The process is prone to human errors of missing testing for certain threats or misinterpreting the damages of certain attacks. Also, because a process of full testing of a large networked system against all threats is quite long, the organization might again end with a too long discovery period after a new threat appears.

Because of the above deficiencies automated penetration testing solutions were introduced in recent years by multiple vendors. These automated solutions reduce human involvement in the penetration testing process, or at least in some of its functions.

A penetration testing process involves at least the following main functions: (i) a reconnaissance function, (ii) an attack function, and (ii) a reporting function. The process may also include additional functions, for example a cleanup function that restores the tested networked system to its original state as it was before the test. In an automated penetration testing system, at least one of the above three functions is at least partially automated, and typically two or three of them are at least partially automated.

A reconnaissance function is the function within a penetration testing system that handles the collection of data about the tested networked system. The collected data may include internal data of networks nodes, data about network traffic within the tested networked system, business intelligence data of the organization owning the tested networked system, etc. The functionality of a prior art reconnaissance function can be implemented, for example, by software executing in a server that is not one of the network nodes of the tested networked system, where the server probes the tested networked system for the purpose of collecting data about it.

An attack function is the function within a penetration testing system that handles the determination of whether security vulnerabilities exist in the tested networked system based on data collected by the reconnaissance function. The functionality of a prior art attack function can be implemented, for example, by software executing in a server that is not one of the nodes of the tested networked system, where the server attempts to attack the tested networked system for the purpose of verifying that it can be compromised.

A reporting function is the function within a penetration testing system that handles the reporting of results of the penetration testing system. The functionality of a prior art reporting function may be implemented, for example, by software executing in the same server that executes the functionality of the attack function, where the server reports the findings of the attack function to an administrator or a CISO of the tested networked system.

FIG. 1A (PRIOR ART) is a block diagram of code modules of a typical penetration testing system. FIG. 1B (PRIOR ART) is a related flow-chart.

In FIG. 1A, code for the reconnaissance function, for the attack function, and for the reporting function are respectively labelled as 20, 30 and 40, and are each schematically illustrated as part of a penetration testing system code module (PTSCM) labelled as 10. The term 'code' is intended broadly and may include any combination of computer-executable code and computer-readable data which when read affects the output of execution of the code. The computer-executable code may be provided as any combination of human-readable code (e.g. in a scripting language such as Python), machine language code, assembler code and byte code, or in any form known in the art. Furthermore, the executable code may include any stored data (e.g. structured data) such as configuration files, XML files, and data residing in any type of database (e.g. a relational database, an object-database, etc.).

In one example and as shown in FIG. 1B, the reconnaissance function (performed in step S21 by execution of reconnaissance function code 20), the attack function (performed in step S31 by execution of attack function code 30) and the reporting function (performed in step S41 by execution of reporting function code 40) are executed in strictly sequential order so that first the reconnaissance function is performed by executing code 20 thereof, then the attack function is performed by executing code 30 thereof, and finally the reporting function is performed 40 by executing code thereof. However, the skilled artisan will appreciate that this order is just one example, and is not a requirement. For example, the attack and the reporting functions may be performed in parallel or in an interleaved way, with the reporting function reporting first results obtained by the attack function, while the attack function is working on additional results. Similarly, the reconnaissance and the attack functions may operate in parallel or in an interleaved way, with the attack function detecting a vulnerability based on first data collected by the reconnaissance function, while the reconnaissance function is working on collecting additional data.

FIG. 1A also illustrates code of an optional cleanup function which is labeled as 50. Also illustrated in FIG. 1B is step S51 of performing a cleanup function—e.g. by executing cleanup function code 50 of FIG. 1A.

"A campaign of penetration testing" is a specific run of a specific test of a specific networked system by the penetration testing system.

A penetration-testing-campaign module may comprise at least part of reconnaissance function code 20, attack function code 30 and optionally cleanup function code 50—for example, in combination with suitable hardware (e.g. one or more computing device 110 and one or more processor(s) 120 thereof) for executing the code.

FIG. 2 illustrates a prior art computing device 110 which may have any form-factor including but not limited to a laptop, a desktop, a mobile phone, a server, a tablet, or any other form factor. The computing device 110 in FIG. 2 includes (i) computer memory 160 which may store code 180; (ii) one or more processors 120 (e.g. central-processing-unit (CPU)) for executing code 180; and (iii) a network interface 150 (e.g. a network card, or a wireless modem).

Memory 160 may include any combination of volatile (e.g. RAM) and non-volatile (e.g. ROM, flash, disk-drive) memory.

Code 180 may include operating-system code—e.g. Windows®, Linux®, Android®, Mac-OS® or any other code.

In one example, a penetration testing system is the combination of (i) code 10 (e.g. including reconnaissance function code 20, attack function code 30, reporting function code 40, and optionally cleanup function code 50); and (ii) one or more computing devices 110 which execute the code 10. For example, a first computing device may execute a first portion of code 10 and a second computing device (e.g. in networked communication with the first computing device) may execute a second portion of code 10.

FIG. 3 illustrates one example of a networked system 200 that may be subjected to penetration testing. The networked system comprises a plurality of nodes—in the example of FIG. 3, 16 nodes are illustrated, each labeled by the letter "N" followed by an integer. Also illustrated in FIG. 3 are two external computing devices 254, 252 that reside outside the networked system 200. Computing device 254 resides 'in the cloud' relative to the networked system 200, while computing device 252 is in communication with the networked system 200 via a local-area network (LAN).

Both of nodes 254 and 252 are "networked system external"—i.e. outside of networked system 200. The term 'networked system external' is abbreviated as "NS-external". In the present document, a network node may be referred to simply as 'node'—'network node' and 'node' are interchangeable. Each network node may be different a computing device 110 illustrated in FIG. 2.

A Discussion of Actual Attack vs. Simulated Attack

All prior art penetration testing systems can be characterized as doing either an "actual attack penetration testing" or as doing a "simulated penetration testing".

A prior art actual attack penetration testing system does its penetration testing by accessing and attempting to attack the tested networked system. Such a system actually accesses the tested networked system during the test and is not limiting itself to simulation. This includes (i) collecting data by the reconnaissance function about the tested networked system and its components by actively probing it. The probing is done by sending queries or other messages to one or more network nodes of the tested networked system, and then deducing information about the tested networked system from the received responses or from network traffic triggered by the queries or the messages. The reconnaissance function is fully implemented by software executing outside the tested networked system or by software executing in one or more network nodes of the tested networked system that analyze network traffic and network packets of the tested networked system, and (ii) verifying that the tested networked system can be compromised by actively attempting to compromise it and checking if it was indeed compromised. This implies that a side-effect of executing an actual attack penetration test might be actually compromising the tested networked system. Typically, prior art actual attack penetration testing systems include a function of cleanup and recovery at the end of the test, in which any compromising operation that was done during the test is undone.

A prior art simulated penetration testing system does its penetration testing by avoiding disturbance to the tested networked system and specifically by avoiding any risk of compromising it. This implies, among other things, that (i) no installation of software agents of any kind on network nodes of the tested networked system is allowed, and (ii) whenever there is a need to verify that the tested networked system can be compromised by an operation or a sequence of operations, the verification is done by simulating the results of that operation or sequence of operations or by otherwise evaluating them, without taking the risk of actually compromising the tested networked system. Some prior art simulated penetration testing systems implement the simulation by duplicating all or parts of the hardware of the tested networked system. Then when there is a need for verifying that an operation or a sequence of operations compromises the tested networked system, this is done by actually attacking the duplicated system without risking the tested system. While this implementation achieves the goal of avoiding the risk of not compromising the tested networked system, it is highly expensive and also difficult to accurately implement, and therefore rarely used.

The Problem to Solve

While the prior art automated penetration testing systems provide great advantages over manual penetration testing systems, they still do not provide a fully satisfactory solution, as they suffer from some deficiencies, examples of which are explained below.

Prior art automated penetration testing systems face difficulties in their reconnaissance function's ability to collect internal data of network nodes. Internal data of a network node is data that is only directly accessible to code executing by a processor of that network node. This may include, for example, factual data about the network node such as the version of the firmware of a solid-state drive installed in that network node. Unless the internal node was already compromised by the penetration testing system, it might be difficult or even impossible for it to determine such internal fact. A human hostile attacker may gain knowledge of such fact by indirect means—for example if he had previously been an employee of the organization owning the tested networked system, or if he is an employee of the vendor supplying the organization with solid-state drives. Once the attacker possesses knowledge of the fact, he might use it to advantage for compromising the network node and consequently compromising the networked system. But a prior art penetration testing system that does not have access to that internal data of the network node might miss the detection of a security vulnerability related to a specific firmware version. This deficiency is mainly problematic for simulated penetration testing systems, but is also relevant to actual attack penetration testing systems, as even active probing by the penetration testing system may not be enough for obtaining internal data of a network node that was not yet compromised when the attempt to probe is performed from outside of the probed network node.

Another deficiency is relevant only to actual attack penetration testing systems that might actually compromise the tested networked system during the test. This characteristic of actual attack penetration testing systems is by itself a security vulnerability. As the testing process might compromise the networked system, there is a risk that the recovery function of the penetration testing system, that is supposed to undo the compromising and make the tested networked system safe again, might fail in fully doing that, and the tested networked system might be left with one or more compromised components without the CISO of the owning organization being aware of it. Additionally, even if the penetration testing system's recovery function is faultless, the testing still makes the tested networked system vulnerable and exposed to attacks during the test, before the recovery function is activated.

Another deficiency of an actual attack penetration testing system is that it cannot answer "what if" questions, as one cannot attack a configuration that does not exist in the real world. For example, a CISO of an organization may want to find out whether adding a new security tool will indeed improve his networked system's immunity to attacks. Or to find how much would the immunity degrade if he will remove an existing security tool that costs a lot of money in licensing fees. In both cases an actual attack penetration testing system cannot answer the question. Another example is determining the vulnerability of a networked system against a new type of attack whose existence is known, but its detailed implementation is not yet known. Again, an actual attack penetration testing system cannot make such determination.

SUMMARY OF EMBODIMENTS

To date, there are two main approaches in penetration testing: (i) actual attack penetration testing, which has the advantage of accuracy, and (ii) simulated penetration testing, which avoids exposing the tested networked system to risk during penetration testing.

An automated penetration testing system that is neither a direct attack penetration testing system, nor a simulated penetration testing system is now disclosed. It includes the use of a reconnaissance agent software modules (RASM) installed on multiple network nodes of the tested networked system, and therefore it is referred to herein as "reconnaissance agent penetration testing system". As discussed below, in embodiments of the invention, the penetration testing system makes use of 'internal data' of multiple nodes of the tested networked system—this internal data is transmitted from the multiple nodes to a remote computing device on which a penetration testing software module is installed.

Towards this end, apparatus and methods are now disclosed which address the above deficiencies, including not exposing any node of the tested networked system to risk, while still providing one or more advantages of actual attack penetration systems.

As will be explained below, these features are combined with software architecture features such that: (i) instances of the RASM installed on multiple network nodes (hereinafter 'RASM-hosting nodes') of the tested networked system transmit internal data of the RASM-hosting nodes to the remote computing device; (ii) this internal data is analyzed on the remote computing device; (iii) all of the analysis required for determining a method for an attacker to compromise the networked system is performed by the remote computing device; and (iv) no network node is put under a risk of being compromised during the testing process.

The aforementioned software architecture features may be useful, for example, for minimizing the CPU burden of penetration testing imposed on each of the multiple nodes of the penetration-tested networked system. Alternatively or additionally, these software architecture features may be useful for updating—e.g. when new threats need to be added to a threat-database, there is no need to update this threat-database on each of the RASM-hosting nodes. Instead, the threat-database may be updated only on the remote computing device.

Preferably, these RASM instances are not completely autonomous, but rather obtain the internal data of the RASM-hosting network nodes and/or transmit the internal data in response to a data-requesting command received, by each of the RASM-hosting network nodes, from the remote computing device.

Similar to actual-attack penetration testing systems, actual data from the network nodes is analyzed to determine the method for the attacker to compromise the networked system. According to the present invention, this actual data includes actual internal data. It should be noted that the internal data of a specific node (i) is only directly accessible to code executing by a processor of the specific node and (ii) is only accessible to any code executing outside of the specific node by receiving it from code executing by a processor of the specific node. Therefore, in order to the remote computing device to analyze such internal data, the RASM instances must be installed on each of the network nodes from which it is desired to obtain data during the test.

Internal data of a network node includes one or more of:
(A) Internal events occurring in the network node, for example the insertion of a USB stick into the network node;
(B) Internal conditions existing in the network node, for example whether the CPU of a given network node is heavily loaded or not; and
(C) Internal factual data about the network node, for example the firmware version of a solid-state storage device attached to the network node.

Even though analysis is performed using actual internal data from the actual network nodes, no node is ever placed at risk during the penetration testing—this is in contrast with actual attack penetration testing systems (this is the 'second rule' discussed below).

Thus, according to embodiments of the invention, the penetration testing is carried out to enforce both first and second rules:
(A) According to the first rule, all of the analyzing of the internal data for determining the method for the attacker to compromise the networked system is performed by the remote computing device. As noted above, this may be useful, for example, for minimizing the CPU burden of penetration testing imposed on each of the nodes of the penetration-tested networked system. Alternatively or additionally (and as noted above), this may be useful for updating—e.g. when new threats need to be added to a threat-database, there is no need to update this threat-database on each of the nodes. Instead, the threat-database may be updated only on the remote computing device; and
(B) According to the second rule, no node is ever placed at risk during the penetration testing. Thus, in embodiments of the invention, it is now possible to enjoy the benefits of the second rule while simultaneously obtaining results that are more accurate than those obtainable by conventional simulated penetration testing.

In order to better understand embodiments of the invention, the reader is referred to three use case examples presented below in the Detailed Description of the Embodiments Section of this document.

Optionally, and in some embodiments preferably, the RASM is preinstalled on each of the participating nodes. Thus, some embodiments provide a RASM 'pre-installation feature' instead of (or in addition to) the features of having the first and second rules enforced.

The pre-installation may make the penetration testing simpler and more reliable. The pre-installation can be closely monitored by the IT people of the organization and any problem or issue of access right can be resolved prior to the testing. Additionally, if agents are employed without being pre-installed, then they are installed instead at runtime during the testing process. This implies that the state of the tested networked system is being changed by the test and unexpected side-effects might occur.

In some embodiments, the RASM instances are pre-installed and both the first and second rules are enforced.

In some embodiments, the RASM instances are pre-installed and only the first rule is enforced.

In some embodiments, the RASM instances are pre-installed and only the second rule is enforced.

One aspect of the invention relates to a method for executing a penetration test of a networked system by a penetration testing system so as to determine, while enforcing first and second rules, a method for an attacker to compromise the networked system. According to the method, the penetration testing system comprises (A) a penetration testing software module installed on a remote computing device and (B) a reconnaissance agent software module (RASM) installed on at least some network nodes of the networked system so that each network node of the networked system on which the RASM is installed is defined as a RASM-hosting network node.

The method for executing the penetration test comprising:
a. obtaining, by each given RASM-hosting network node of one or more RASM-hosting network nodes, respective internal data of the given RASM-hosting network node, the obtaining comprising executing computer code of the RASM by one or more processors of the given RASM-hosting network node, the respective internal data including data about at least one of: A. an internal event of the given RASM hosting network node, B. an internal condition of the given RASM-hosting network node, and C. an internal fact of the given RASM-hosting network node; b. transmitting to the remote computing device, by each given RASM-hosting network node of the one or more RASM-hosting network nodes, the obtained respective internal data of the given RASM-hosting network node, the transmitting comprising executing computer code of the RASM by the one or more processors of the given RASM-hosting network node; c. analyzing, by the remote computing device, the internal data transmitted by at least one RASM-hosting network node of the one or more RASM-hosting network nodes, so as to determine the method for the attacker to compromise the networked system, the analyzing comprising executing computer code of the penetration testing software module by one or more processors of the remote computing device; and d. reporting, by the penetration testing system, the method for the attacker to compromise the networked system, the reporting comprising executing computer code of the penetration testing software module by the one or more processors of the remote computing device, wherein the reporting comprises at least one of (i) causing a display device to display a report including information about the determined method for the attacker to compromise the networked system, (ii) recording the report including the information about the determined method for the attacker to compromise the networked system in a file, and (iii) electronically transmitting the report including the information about the determined method for the attacker to compromise the networked system, wherein each given RASM-hosting network node of the one or more RASM-hosting network nodes performs at least one of step (a) and step (b) in response to a receiving of one or more data-requesting commands from the remote computing device, and wherein the method for executing the penetration test is performed in a manner that enforces the first and second rules such that: A. according to the first rule, all of the analyzing of the internal data for determining the method for the attacker to compromise the networked system is performed by the remote computing device; and B. according to the second rule, no network node of the networked system is ever put at risk of being compromised by the executing of the penetration test.

In some embodiments, the RASM is installed on at least one of the one or more RASM-hosting network nodes prior to the beginning of the executing of the penetration test.

In some embodiments, the RASM is installed on all of the one or more RASM-hosting network nodes prior to the beginning of the executing of the penetration test.

In some embodiments, the RASM is installed on every network node of the networked system which is a RASM-hosting network node prior to the beginning of the executing of the penetration test.

In some embodiments, at least one given RASM-hosting network node of the one or more RASM-hosting network nodes performs the obtaining in response to the receiving, by the given RASM-hosting network node, of the one or more data-requesting commands from the remote computing device.

In some embodiments, at least one given RASM-hosting network node of the one or more RASM-hosting network nodes obtains at least some of the respective internal data of the given RASM-hosting network node transmitted in step (b) before the receiving of the one or more data-requesting commands by the given RASM-hosting network node.

In some embodiments, each given RASM-hosting network node of the one or more RASM-hosting network nodes performs both steps (a) and (b) in response to the receiving, by the given RASM-hosting network node, of the one or more data-requesting commands from the remote computing device.

In some embodiments, the information about the method for an attacker to compromise the networked system comprises at least one of: (i) information about a method for compromising one network node of the networked system (ii) information about one or more network nodes of the networked system which are vulnerable to attack, (iii) information about one or more resources of the networked system that could be damaged or exported out of the networked system by an attacker, and (iv) information about an ordered list of network nodes of the networked system, wherein an attacker could use a specific network node in said ordered list that is already compromised as a basis for compromising another network node that immediately follows said specific network node in said ordered list.

In some embodiments, the analyzing comprises: (i) assessing, by said remote computing device, if a first network node can be compromised; and (ii) in the event that the assessing indicates that said first network node can be compromised, A. simulating or evaluating, by said remote computing device, a result of compromising said first network node; and B. determining, by said remote computing device and based on said result, that a second network node can be compromised.

Another aspect of the invention relates to a penetration testing system for executing a penetration test of a networked system so as to determine, while enforcing first and second rules, a method for an attacker to compromise the networked system. The penetration testing system comprises: a. a remote computing device comprising a computer memory and one or more processors, the remote computing device in electronic communication with the networked system; b. a first non-transitory computer-readable storage medium containing first code of a reconnaissance agent software module (RASM), wherein execution of the first code of the RASM by respective one or more processors of each given network node of a first set of network nodes of the networked system, causes the one or more processors of the given network node of the first set to carry out the following: i. obtaining respective internal data of the given network node of the first set, the respective internal data including data about at least one of: A. an internal event of the given network node of the first set, B. an internal condition of the given network node of the first set, and C. an internal fact of the given network node of the first set; and ii. transmitting to the remote computing device and out of the given network node of the first set the obtained respective internal data of the given network node of the first set, such that at least one of the obtaining and the transmitting is performed in response to one or more data-requesting commands issued by the remote computing device; c. a second non-transitory computer-readable storage medium containing second code of a penetration testing software module, wherein execution of the second code of the penetration testing software module by the one or more processors of the remote computing device: i. analyzes the respective internal data transmitted by each given network node of a second set of network-nodes of the networked system so as to determine the method for the attacker to compromise the networked system; and ii. reports the method for the attacker to compromise the networked system, wherein the reporting comprises at least one of (A) causing a display device to display a report including information about the determined method for the attacker to compromise the networked system, (B) recording the report including the information about the determined method for the attacker to compromise the networked system in a file, and (C) electronically transmitting a report including the information about the determined method for the attacker to compromise the networked system, wherein (i) the execution of the first code of the RASM by the respective one or more processors of each given network node of the first set of network nodes of the networked system; and (ii) the execution of the second code of the penetration testing software module by the one or more processors of the remote computing device, subject the networked system to penetration testing while enforcing both of the first and second rules such that: A. according to the first rule, all of the analyzing of the internal data for determining the method for the attacker to compromise the networked system is performed by the remote computing device; and B. according to the second rule, no network node of the networked system is ever put at risk of being compromised by the executing of the penetration test.

In some embodiments, for at least one given network node of the first set of network nodes, the execution of the first code by the respective one or more processors of the given network node performs the obtaining in response to the one or more data-requesting commands issued by the remote computing device.

In some embodiments, for at least one given network node of the first set of network nodes, the execution of the first code by the respective one or more processors of the given network node performs the obtaining of at least some of the respective internal data of the given network node before the issuing of the one or more data-requesting commands by the remote computing device.

In some embodiments, for each given network node of the first set of network nodes, the execution of the first code by the respective one or more processors of the given network node performs the obtaining and the transmitting in response to the one or more data-requesting commands issued by the remote computing device.

In some embodiments, the information about the method for an attacker to compromise the networked system comprises at least one of: (i) information about a method for compromising one network node of the networked system (ii) information about one or more network nodes of the networked system which are vulnerable to attack, (iii) information about one or more resources of the networked system that could be damaged or exported out of the networked system by an attacker, and (iv) information about an ordered list of network nodes of the networked system, wherein an attacker could use a specific network node in said ordered list that is already compromised as a basis for compromising another network node that immediately follows said specific network node in said ordered list.

In some embodiments, the analyzing performed by the execution of the second code of the penetration testing software module by the one or more processors of the remote computing device comprises: (i) assessing if a first network node can be compromised; and (ii) in the event that the assessing indicates that said first network node can be compromised, A. simulating or evaluating a result of compromising said first network node; and B. determining that a second network node can be compromised.

Another aspect of the invention relates to a method for executing a penetration test of a networked system by a penetration testing system so as to determine a method for an attacker to compromise the networked system, where the penetration testing system comprises (A) a penetration testing software module installed on a remote computing device and (B) a reconnaissance agent software module (RASM) installable on network nodes of the networked system so that each network node of the networked system on which the RASM is installed is defined as a RASM-hosting network node.

The method for executing the penetration test comprises: a. subsequent to an installing of the RASM on at least some network nodes of the networked system, which installing occurs prior to starting the executing of the penetration test, performing the following: i. obtaining, by each given RASM-hosting network node of one or more RASM-hosting network nodes, respective internal data of the given RASM-hosting network node, the obtaining comprising executing computer code of the RASM by one or more processors of the given RASM-hosting network node, the respective internal data including data about at least one of: A. an internal event of the given RASM-hosting network node, B. an internal condition of the given RASM-hosting network node, and C. an internal fact of the given RASM-hosting network node; and ii. transmitting to the remote computing device, by each given RASM-hosting network node of the one or more RASM-hosting network nodes, the obtained respective internal data of the given RASM-hosting network node, the transmitting comprising executing computer code of the RASM by the one or more processors of the given RASM-hosting network node; b. analyzing, by the remote computing device, the internal data transmitted by at least one RASM-hosting network node of the one or more RASM-hosting network nodes, so as to determine the method for the attacker to compromise the networked system, the analyzing comprising executing computer code of the penetration testing software module by one or more processors of the remote computing device; and c. reporting, by the penetration testing system, the method for the attacker to compromise the networked system, the reporting comprising executing computer code of the penetration testing software module by the one or more processors of the remote computing device, wherein the reporting comprises at least one of (i) causing a display device to display a report including information about the determined method for the attacker to compromise the networked system, (ii) recording the report including the information about the determined method for the attacker to compromise the networked system in a file, and (iii) electronically transmitting the report including the information about the determined method for the attacker to compromise the networked system, wherein each given RASM-hosting network node of the one or more RASM-hosting network nodes performs at least one of step a(i) and step a(ii) in response to a receiving of one or more data-requesting commands from the remote computing device.

In some embodiments, further comprising the step of: d. before commencing step (a), installing the RASM on the at least some network nodes of the networked system.

In some embodiments, the method for executing the penetration test is performed in a manner that enforces at least one of first and second rules such that: A. according to the first rule, all of the analyzing of the internal data for determining the method for the attacker to compromise the networked system is performed by the remote computing device; and B. according to the second rule, no network node of the networked system is ever put at risk of being compromised by the executing of the penetration test.

In some embodiments, the method for executing the penetration test is performed in a manner that enforces at least the first rule.

In some embodiments, the method for executing the penetration test is performed in a manner that enforces at least the second rule.

In some embodiments, the method for executing the penetration test is performed in a manner that enforces both the first and second rules.

In some embodiments, at least one given RASM-hosting network node of the one or more RASM-hosting network nodes performs the obtaining in response to the receiving, by the given RASM-hosting network node, of the one or more data-requesting commands from the remote computing device.

In some embodiments, at least one given RASM-hosting network node of the one or more RASM-hosting network nodes obtains at least some of the respective internal data of the given RASM-hosting network node transmitted in step a(ii) before the receiving of the one or more data-requesting commands by the given RASM-hosting network node.

In some embodiments, each given RASM-hosting network node of the one or more RASM-hosting network nodes performs both steps a(i) and a(ii) in response to the receiving, by the given RASM-hosting network node, of the one or more data-requesting commands from the remote computing device.

In some embodiments, the information about the method for an attacker to compromise the networked system comprises at least one of: (i) information about a method for compromising one network node of the networked system (ii) information about one or more network nodes of the networked system which are vulnerable to attack, (iii) information about one or more resources of the networked system that could be damaged or exported out of the networked system by an attacker, and (iv) information about an ordered list of network nodes of the networked system, wherein an attacker could use a specific network node in said ordered list that is already compromised as a basis for compromising another network node that immediately follows said specific network node in said ordered list.

In some embodiments, said analyzing comprises: (i) assessing, by said remote computing device, if a first network node can be compromised; (ii) in the event that the assessing indicates that said first network node can be compromised, A. simulating or evaluating, by said remote computing device, a result of compromising said first network node; and B. determining, by said remote computing device and based on said result, that a second network node can be compromised.

Another aspect of the invention relates to a penetration testing system for executing a penetration test of a networked system so as to determine a method for an attacker to compromise the networked system, the penetration testing system comprising: a. a remote computing device comprising a computer memory and one or more processors, the remote computing device in electronic communication with the networked system; b. a first non-transitory computer-readable storage medium containing first code of a reconnaissance agent software module (RASM), wherein for a first set of network-nodes of the networked system on which the RASM is pre-installed before starting the executing of the penetration test, subsequent execution of the first code, after starting the executing of the penetration test, by respective one or more processors of each given network node of the first set of network nodes, causes the one or more processors of the given network node of the first set to carry out the following: i. obtaining respective internal data of the given network node of the first set, the respective internal data including data about at least one of: A. an internal event of the given network node of the first set, B. an internal condition of the given network node of the first set, and C. an internal fact of the given network node of the first set; and ii. transmitting to the remote computing device and out of the given network node of the first set the obtained respective internal data of the given network node of the first set, such that at least one of the obtaining and the transmitting is performed in response to one or more data-requesting commands issued by the remote computing device; and c. a second non-transitory computer-readable storage medium containing second code of a penetration testing software module, wherein execution of the second code of the penetration testing software module by the one or more processors of the remote computing device: i. analyzes the respective internal data transmitted by each given network node of a second set of network-nodes of the networked system, so as to determine the method for the attacker to compromise the networked system; and ii. reports the method for the attacker to compromise the networked system, wherein the reporting comprises at least one of (A) causing a display device to display a report including information about the determined method for the attacker to compromise the networked system, (B) recording the report including the information about the determined method for the attacker to compromise the networked system in a file, and (C) electronically transmitting a report including the information about the determined method for the attacker to compromise the networked system, wherein (i) the execution of the first code of the RASM by the respective one or more processors of each given network node of the first set of network nodes of the networked system; and (ii) the execution of the second code of the penetration testing software module by the one or more processors of the remote computing device, subject the networked system to penetration testing.

In some embodiments, (i) the execution of the first code of the RASM by the respective one or more processors of each given network node of the first set of network nodes of the networked system; and (ii) the execution of the second code of the penetration testing software module by the one or more processors of the remote computing device, subject the networked system to penetration testing while enforcing a rule such that all of the analyzing of the internal data for determining the method for the attacker to compromise the networked system is performed by the remote computing device.

In some embodiments, (i) the execution of the first code of the RASM by the respective one or more processors of each given network node of the first set of network nodes of the networked system; and (ii) the execution of the second code of the penetration testing software module by the one or more processors of the remote computing device, subject the networked system to penetration testing while enforcing a rule such that no network node of the networked system is ever put at risk of being compromised by the executing of the penetration test.

In some embodiments, (i) the execution of the first code of the RASM by the respective one or more processors of each given network node of the first set of network nodes of the networked system; and (ii) the execution of the second code of the penetration testing software module by the one or more processors of the remote computing device, subject the networked system to penetration testing while enforcing both first and second rules such that: A. according to the first rule, all of the analyzing of the internal data for determining the method for the attacker to compromise the networked system is performed by the remote computing device; and B. according to the second rule, no network node of the networked system is ever put at risk of being compromised by the executing of the penetration test.

In some embodiments—for at least one given network node of the first set of network nodes, the execution of the first code by the respective one or more processors of the given network node performs the obtaining in response to the one or more data-requesting commands issued by the remote computing device.

In some embodiments—for at least one given network node of the first set of network nodes, the execution of the first code by the respective one or more processors of the given network node performs the obtaining of at least some of the respective internal data of the given network node before the issuing of the one or more data-requesting commands by the remote computing device.

In some embodiments, for each given network node of the first set of network nodes, the execution of the first code by the respective one or more processors of the given network node performs the obtaining and the transmitting in response to the one or more data-requesting commands issued by the remote computing device.

In some embodiments, the information about the method for an attacker to compromise the networked system comprises at least one of: (i) information about a method for compromising one network node of the networked system (ii) information about one or more network nodes of the networked system which are vulnerable to attack, (iii) information about one or more resources of the networked system that could be damaged or exported out of the networked system by an attacker, and (iv) information about an ordered list of network nodes of the networked system, wherein an attacker could use a specific network node in said ordered list that is already compromised as a basis for compromising another network node that immediately follows said specific network node in said ordered list.

In some embodiments, the analyzing performed by the execution of the second code of the penetration testing software module by the one or more processors of the remote computing device comprises: (i) assessing if a first network node can be compromised; (ii) in the event that the assessing indicates that said first network node can be compromised, A. simulating or evaluating a result of compromising said first network node; and B. determining that a second network node can be compromised.

In some embodiments of the invention, the presently-disclosed penetration testing system further includes a penetration testing software module that is installed on a remote computing device which can communicate with at least one of the network nodes of the tested networked system on which a reconnaissance agent is installed. The penetration testing software module implements (i) the portion of the reconnaissance function that is not implemented by the multiple instances of the reconnaissance agent, (ii) the attack function and (iii) the reporting function. Optionally, it may also implement other functions of the penetration testing process, for example a recovery function.

In some embodiments of the invention, one or more (i.e. any combination of) the following features are provided:
A. The system includes a local agent installed on multiple network nodes.
B. The agent is installed before starting the test.
C. Each instance of the agent collects data, including internal data of the network node on which it is installed.
D. The system includes a remote server that does (at least) the determination of vulnerabilities.
E. The agent reports to the server in response to the server's commands.
F. The agent reports raw data and does not determine vulnerabilities. It is the server that does such determination.
G. The agent collects data without risking compromising the hosting node.
H. The remote server verifies that a potential vulnerability is indeed a vulnerability without risking compromising the networked system. This implies it is not using real attacks of the tested system.
I. The attack process is iterative—one node at a time.

BRIEF DESCRIPTION OF THE DRAWINGS

FIGS. 7, 8A-8B, 10A-10C and 11A-11C are flow-charts of different methods of penetration testing the networked system according to embodiments of the invention.

DETAILED DESCRIPTION OF EMBODIMENTS

This disclosure should be interpreted according to the definitions in the "Definitions Section" at the end of the specification. In case of a contradiction between the definitions in the "Definitions Section" at the end of the specification and other sections of this disclosure, the "Definitions Section" at the end of the specification section should prevail.

In case of a contradiction between the "Definitions Section" at the end of the specification and a definition or a description in any other document, including in another document incorporated in this disclosure by reference, the "Definitions Section" at the end of the specification should prevail, even if the definition or the description in the other document is commonly accepted by a person of ordinary skill in the art.

Figure 1A:
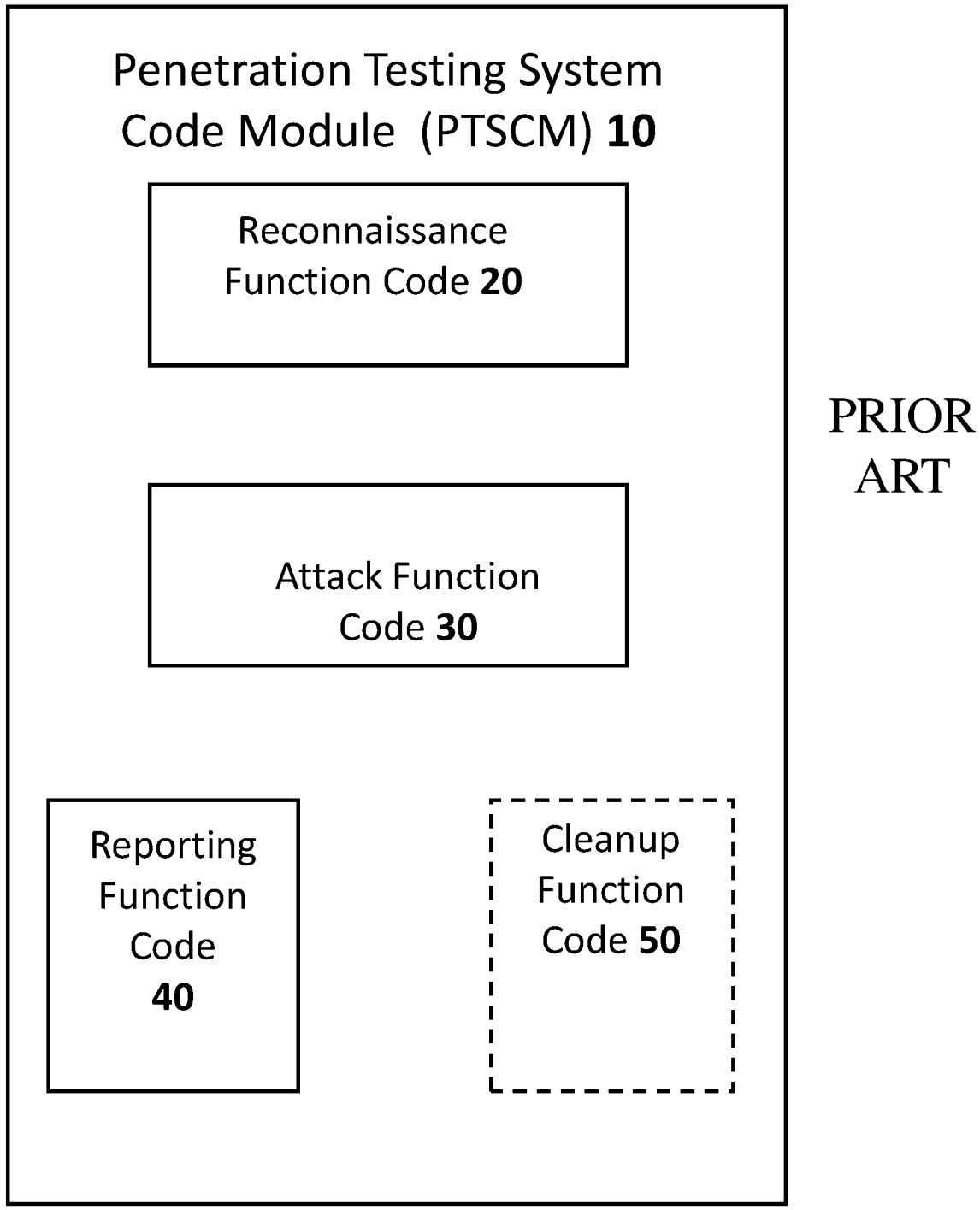
FIG. 1A (PRIOR ART) is a block diagram of code modules of a typical penetration testing system.
Figure 1B:
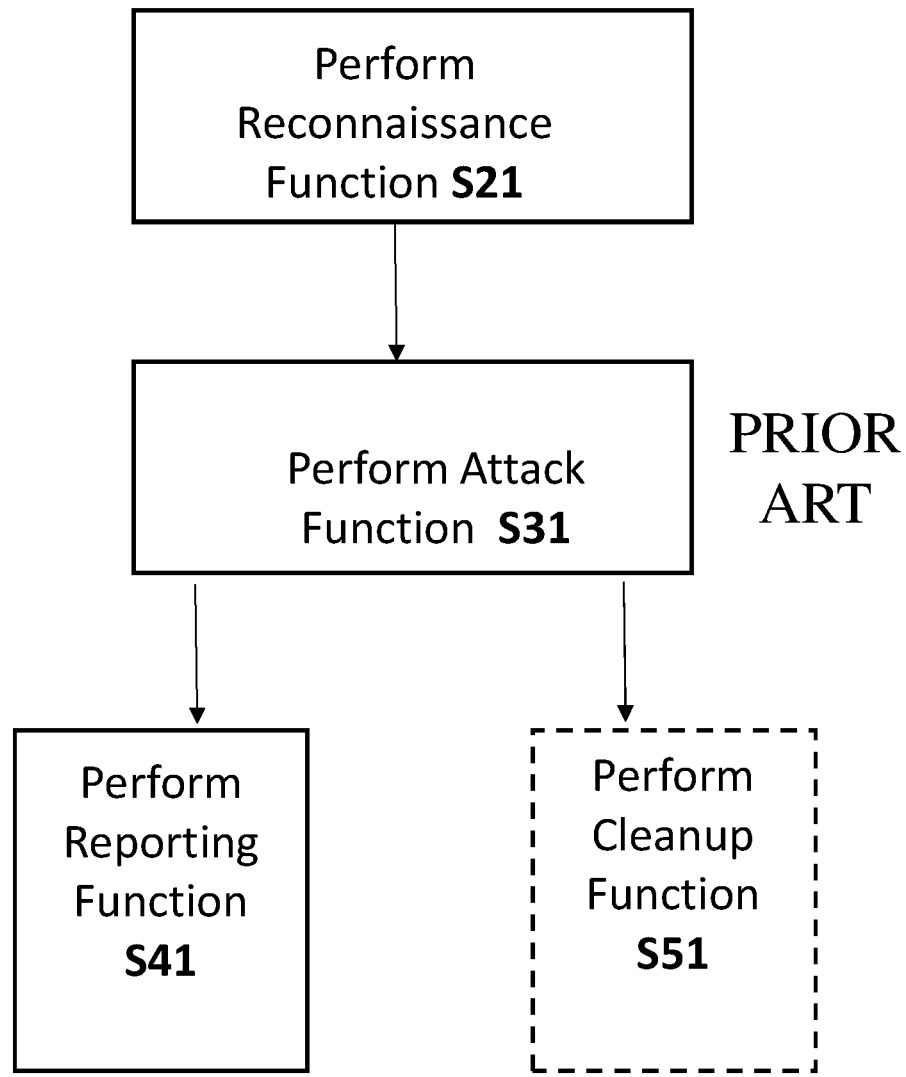
FIG. 1B (PRIOR ART) is a related flow-chart.
Figure 2:
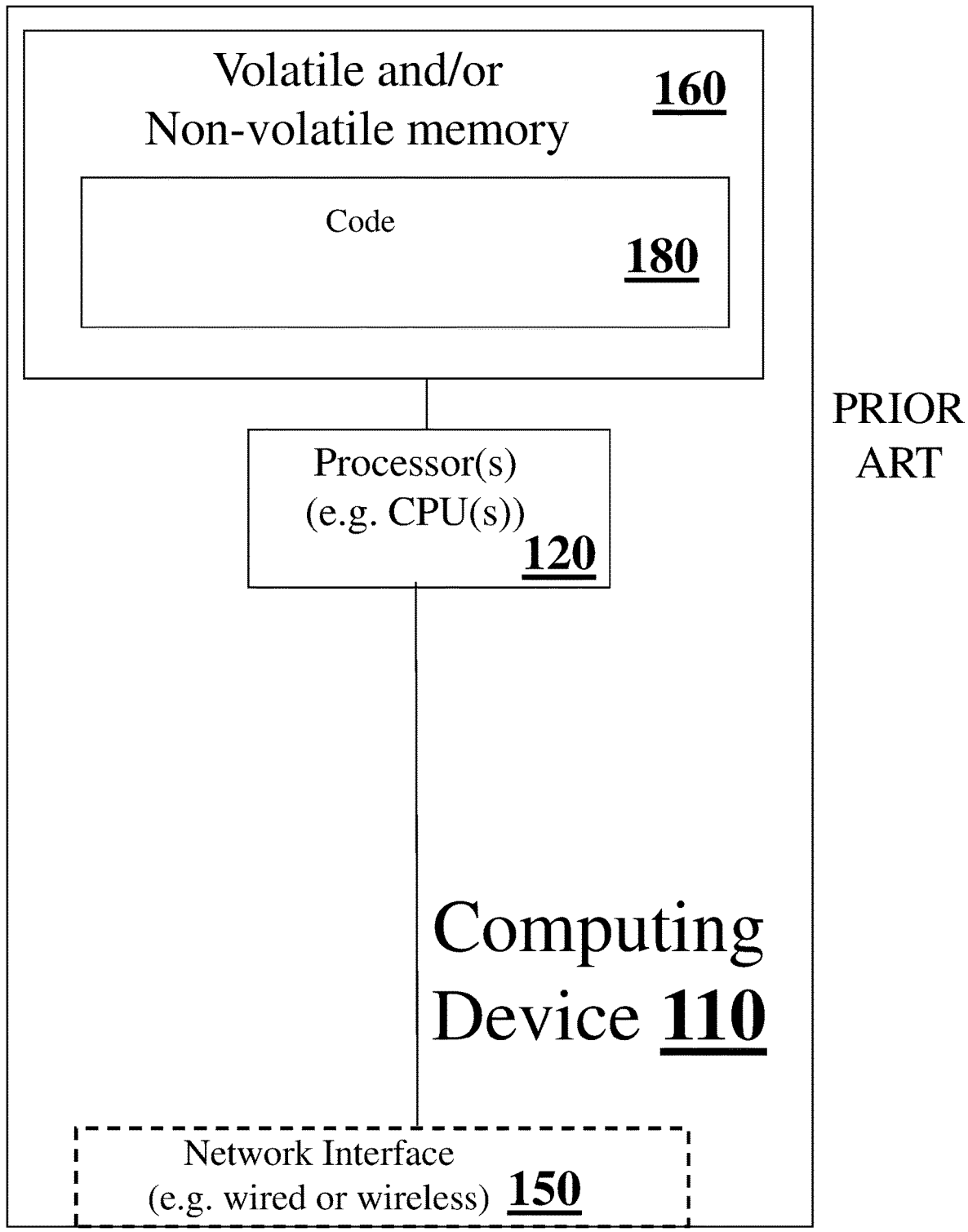
FIG. 2 (PRIOR ART) illustrates a prior art computing device.
Figure 3:
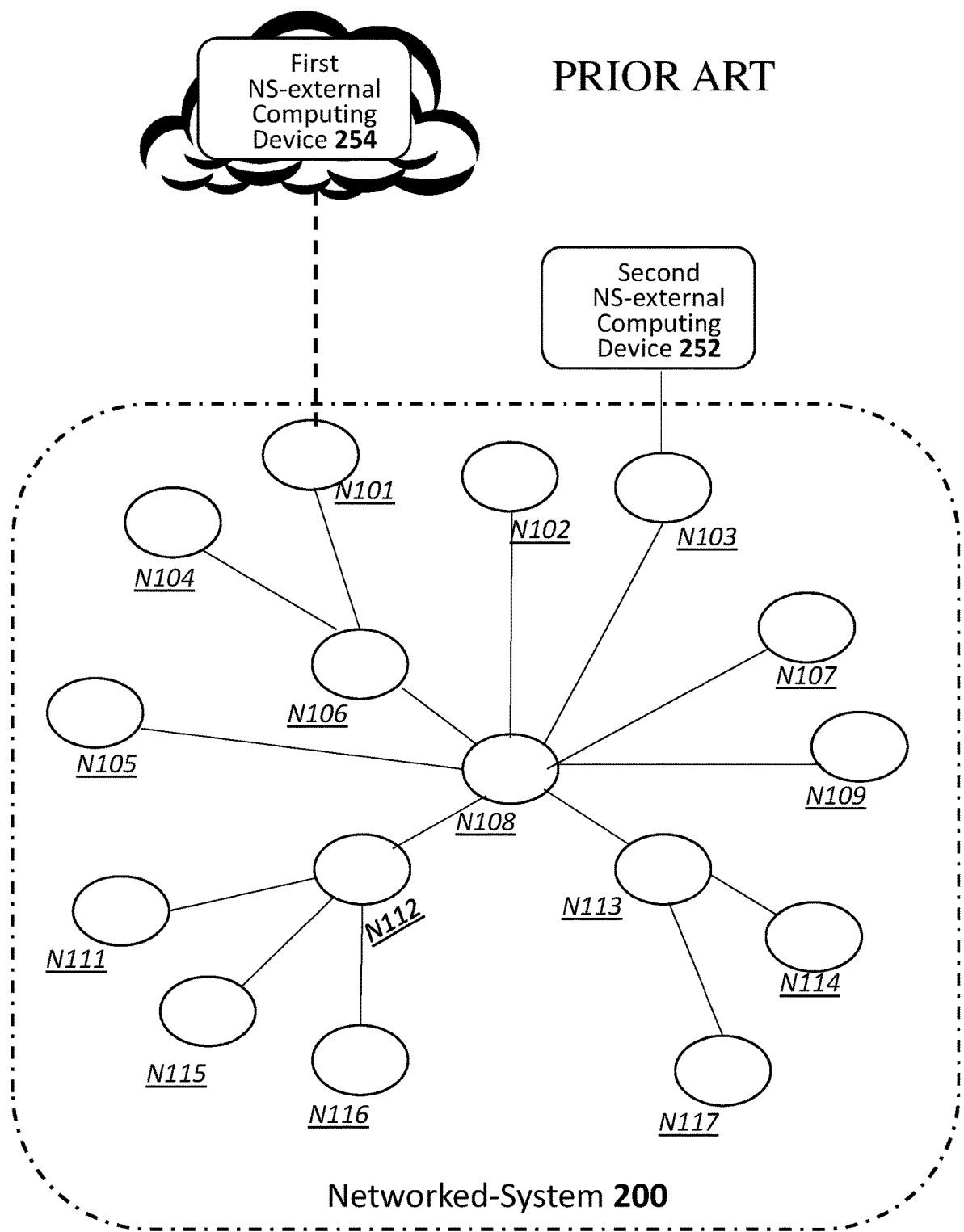
FIG. 3 (PRIOR ART) illustrates a prior art example of a networked system that may be subjected to a penetration test—the networked system comprises a plurality of network nodes.

Embodiments of the invention relate to penetration testing of networked systems, such as that illustrated in FIG. 3.

Figure 4:
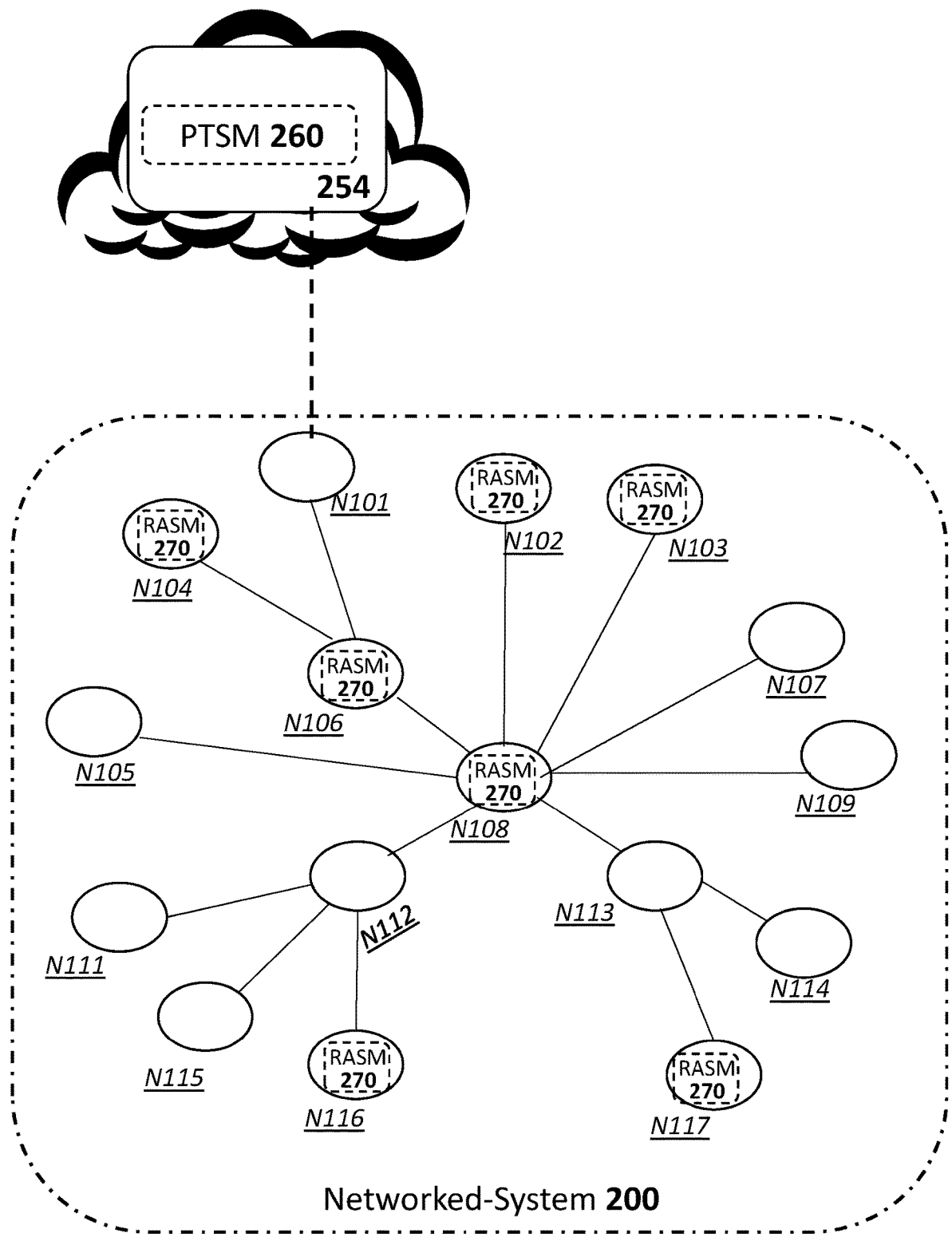
FIGS. 4-5 and 9 illustrate examples of penetration testing systems where a reconnaissance agent software module (RASM) is installed on multiple nodes of the networked system, where the RASM together with a penetration testing software module (PTSM) subject the networked system to penetration testing.
Figure 5:
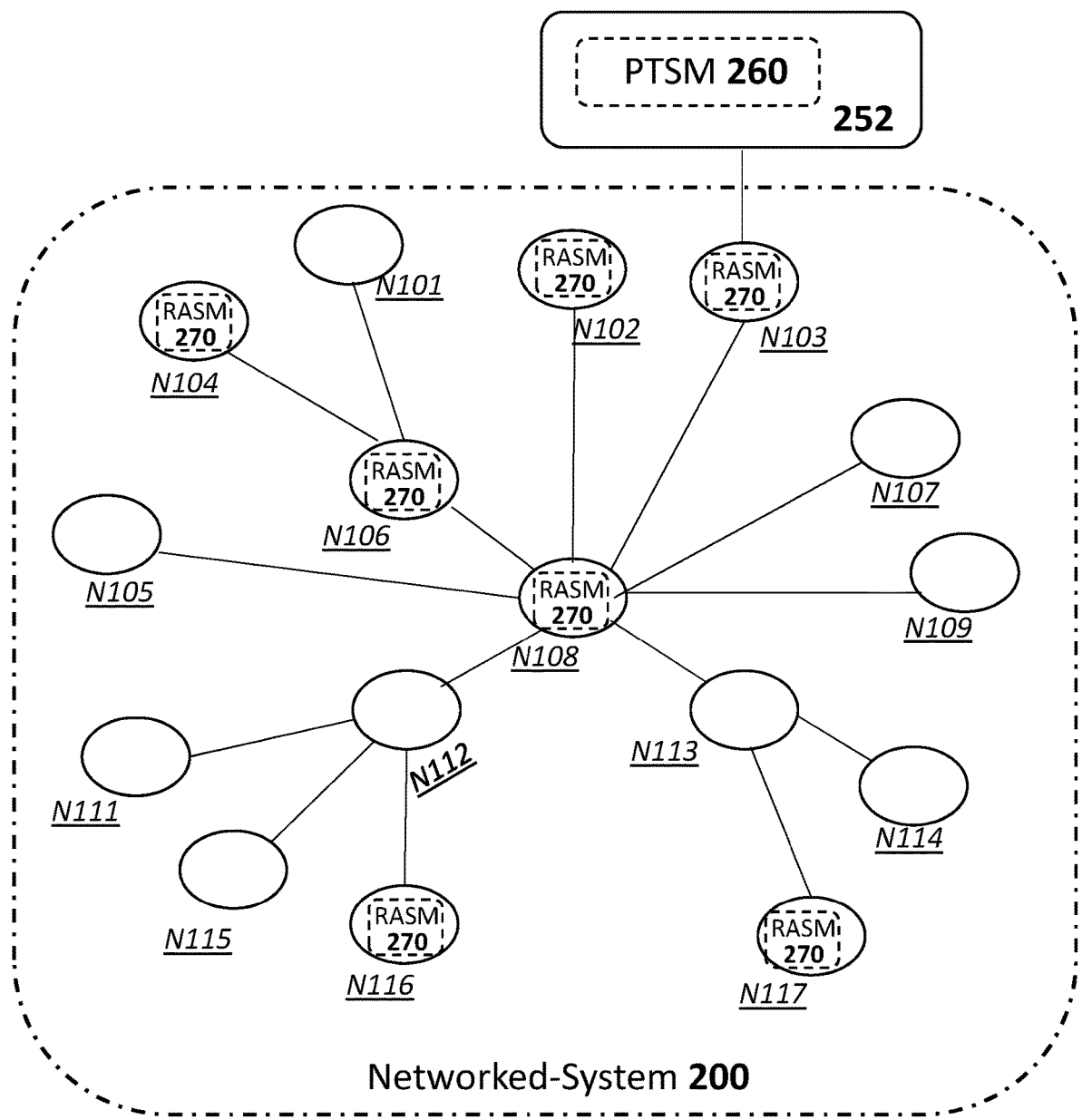
Figure 6:
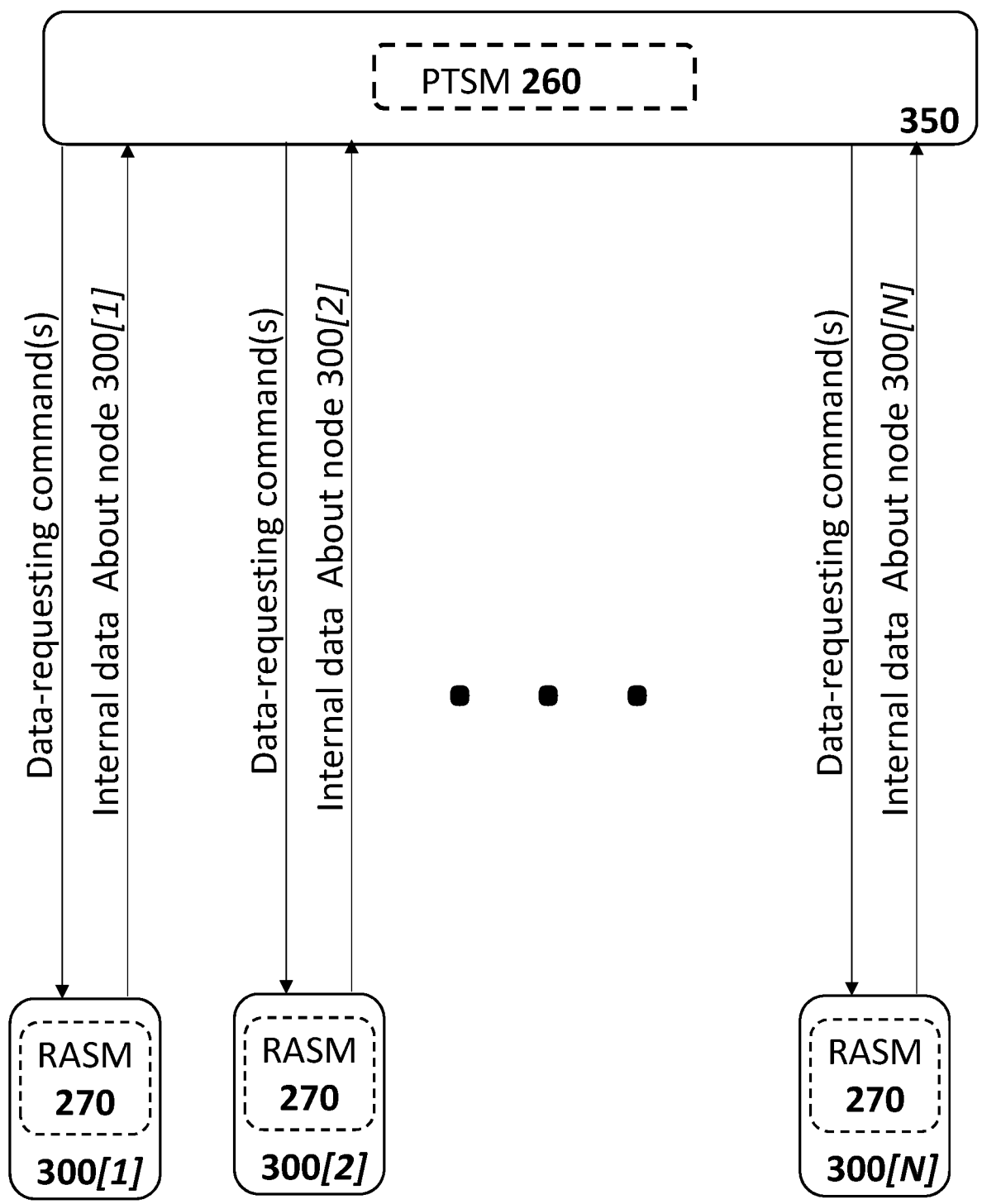
FIG. 6 illustrates communications between the PTSM and a plurality of RASMs.
Figure 7:
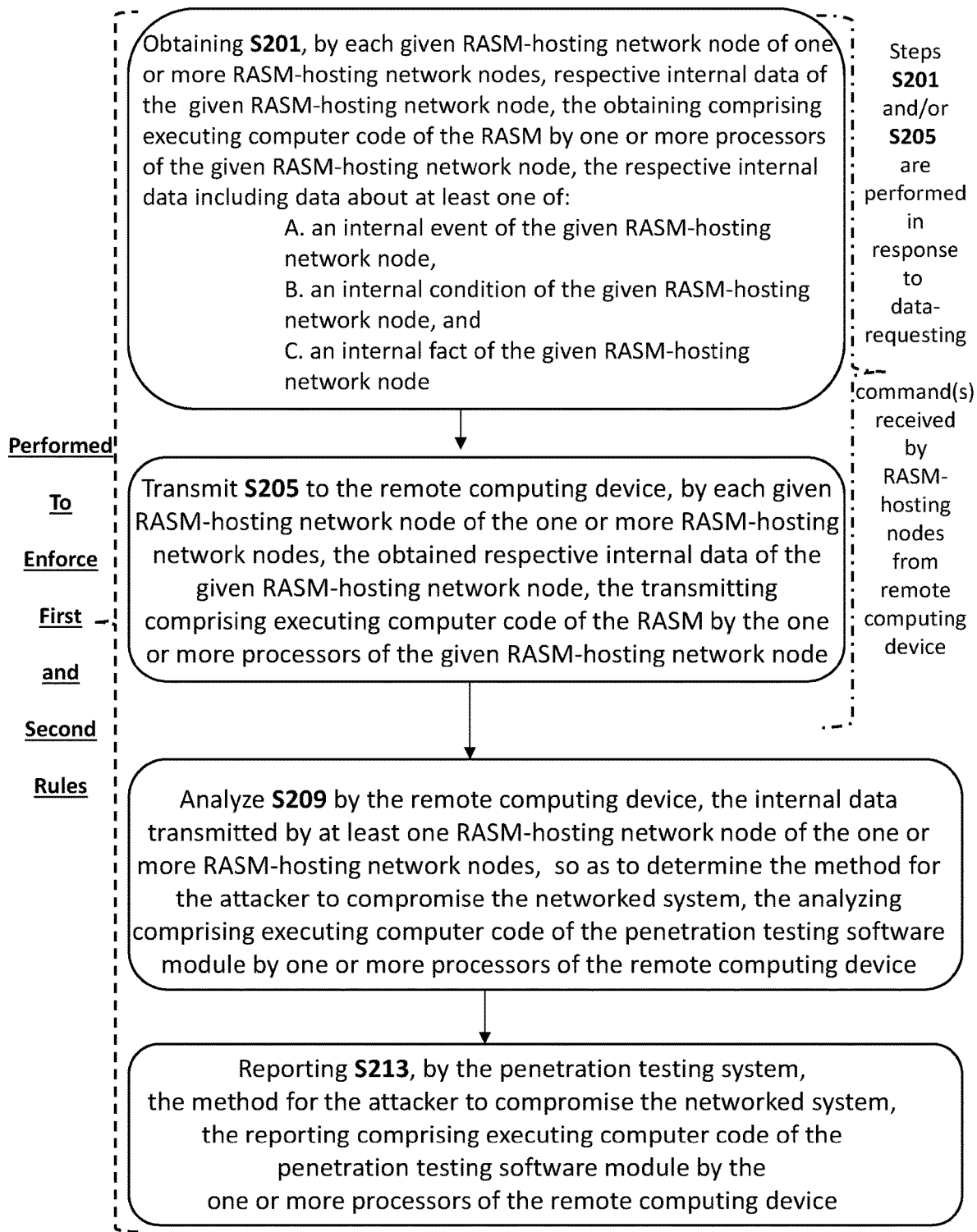

FIG. 4-5 illustrate examples of penetration testing systems for testing networked systems, such as that illustrated in FIG. 6. FIGS. 7-8 are flow charts of methods of penetration testing—the methods of FIGS. 7-8 may be performed, for example, using the penetration testing system of FIGS. 4-5 in order to penetration test the networked system of FIG. 3.

FIG. 6 illustrates communications between the PTSM and a plurality of nodes hosting the RASM.

Before presenting further discussion of these figures, a description of three Use Case Examples, related to presently-disclosed techniques for penetration testing, is now presented.

Use Case Example 1

Networked System/Penetration Testing System for Example 1:

The first non-limiting example relates to a networked system having the following properties: (i) the networked system comprises a plurality of laptop or desktop work-stations, each of which is a network node; (ii) each network node work-station has one or more USB ports; (iii) a first work-station/node ("Node A") is "strongly defended"—on this work-station/node the most recent version of Windows® is installed including all of the latest security patches; (iv) a second work-station/node ("Node B") is "weakly defended"—on this node, a much older version of Window has been installed, and security patches have not been installed for over two years.

This networked system is subjected to penetration testing.

In this example, a penetration testing software module is installed on a remote computing device which is outside of the networked system—in this example, the remote computing device is deployed in the cloud relative to the networked system, and is in networked communication with the networked system. This particular architecture is illustrated in FIG. 4.

In example 1, the terms "work-station A" and "node A" are used interchangeably; Similarly, the terms "work-station B" and "Node B" are also used interchangeably.

Activity that Typically Occurs in the Networked System for Example 1:

In addition to the aforementioned networked system and the aforementioned penetration testing system, the first example relates to first, second and third office workers.

The first office worker owns a USB memory stick having the serial number "XA2312YAFIQ", tends to use both work-stations A and B, and occasionally inserts her USB memory stick into the USB ports of each of those two work-stations.

The second office worker owns a USB memory stick having serial number "9232XG292ZZZ". The second office worker (i) uses only work station A; (ii) occasionally inserts his USB memory stick into USB ports of work-station A; (iii) never inserts his USB memory stick into USB ports of station B.

The third office worker owns a USB memory stick having serial number "JIJI88812ACDQP". The third office worker (i) uses only work-station B; (ii) occasionally inserts his USB memory stick into USB ports of work station B; (iii) never inserts his USB memory stick into USB ports of station A.

In this example, "user" and "office worker" are used interchangeably.

Goal of the Penetration Testing Campaign for Example 1:

In example 1, the goal of the penetration testing campaign is for an attacker to compromise Node A—only if the attacker succeeds to compromise Node A is the penetration testing campaign considered a success.

Timing of the Penetration Testing Campaign for Example 1:

In this first example, the penetration testing campaign commences at 10 AM on Apr. 1, 2017 and concludes at 12 noon on Apr. 1, 2017. Thus, in this example the "Commencement Time" is 10 AM on Apr. 1, 2017. Prior to the Commencement Time (e.g. on Mar. 31, 2017), the RASM is pre-installed on each node of the networked system, including Node A which is strongly-defended and Node B which is weakly-defended.

During the two-hour penetration testing campaign, processor(s) of Node A execute code of the RASM to "listen" to events which occur on USB ports of Node A—these events including coupling events, decoupling events, and transfer of data-files (e.g. from the USB memory stick to Node A or vice versa). Similarly, processor(s) of Node B execute code of the RASM to "listen"" to events which occur on USB ports of Node B.

In this example, at 10:01 AM Node A (i.e. by executing code of RASM) transmits to the remote computing device "Windows version/update data" for Node A—the Windows version/update data transmitted from Node A indicates that the most recent version of Windows® including all of the latest security patches is installed on Node A.

In this example, at 10:02 AM Node B (i.e. by executing code of RASM) transmits to the remote computing device "Windows version/update data" for Node B—the Windows® version/update data transmitted from Node B indicates that (i) an older version of Windows® is installed on Node B and (ii) the most recent security patch installed on Node B is over two years old.

In this example, executing code of each instance of the RASM stores a USB-event log file (i.e. a first USB-event log file on Node A for USB events of Node A and a second USB-event log file on Node B for USB events of Node B). Each USB-event log file is updated on an ongoing basis in response to detected events that occur at the USB ports of the corresponding node. Updates of the USB log-files occur locally (i.e. on Nodes A and B) on an ongoing basis without requiring any data-requesting commands from the remote computing device.

USB-Event Log Files for Example 1:

The content of the USB-event log files (the entire log files or data describing the most recent updates to the log files) are only transmitted out of Nodes A and B (i.e. by executing code of the RASM on Nodes A and B) to the remote computing device in response to a data-requesting command received at each of the nodes (i.e. Nodes A and B) from the remote computing device—e.g. processor(s) of the remote computing device execute code of the penetration testing software module to issue the data-requesting commands and to transmit these data-requesting commands to Nodes A and B.

In this first example, the RASM instances which listen to the USB ports on Nodes A and B detect the following USB-related events that occur at the USB ports:

| Event No. | Time | Description | Status After Event |
| --- | --- | --- | --- |
| Begin | 10:00 AM | | Node A - no memory stick coupled<br>Node B - no memory stick coupled |
| Event A1 | 10:12 AM | At Node A - USB memory stick having serial number "XA2312YAFIQ" (i.e. belonging to the first user) is coupled to a USB port of Node A | Node A - Memory stick belonging to the first user is coupled<br>Node B - no memory stick coupled |
| Event B1 | 10:13 AM | At Node B - USB memory stick having serial number "JIJI88812ACDQP" (i.e. belonging to the third user) is coupled to a USB port of Node B | Node A - Memory stick belonging to the first user is coupled<br>Node B - Memory stick belonging to the third user is coupled |
| Event A2 | 10:22 AM | At Node A - USB memory stick having serial number "XA2312YAFIQ" (i.e. belonging to the first user) is disconnected from a USB port of Node A | Node A - No memory stick coupled<br>Node B - Memory stick belonging to the third user is coupled |
| Event A3 | 10:40 AM | At Node A - USB memory stick having serial number "9232XG292ZZZ" (i.e. belonging to the second user) is coupled to a USB port of Node A. | Node A - Memory stick belonging to the second user is coupled<br>Node B - Memory stick belonging to the third user is coupled |
| Event B2 | 10:59 AM | At Node B - USB memory stick having serial number "JIJI88812ACDQP" (i.e. belonging to the third user) is disconnected from a USB port of Node B | Node A - Memory stick belonging to the second user is coupled<br>Node B - No memory stick coupled |

-continued

| Event No. | Time | Description | Status After Event |
|---|---|---|---|
| Event B3 | 11:13 AM | At Node B - USB memory stick having serial number "XA2312YAFIQ" (i.e. belonging to the first user) is coupled to a USB port of Node B | Node A - Memory stick belonging to the second user is coupled<br>Node B - Memory stick belonging to the first user is coupled |
| Event B4 | 11:16 AM | Two files are copied from the host (Node B) to the USB memory stick XA2312YAFIQ (i.e. belonging to the first user) - a text file and an MS-Word file | Node A - Memory stick belonging to the second user is coupled<br>Node B - Memory stick belonging to the first user is coupled |
| Event A4 | 11:19 AM | At Node A - USB memory stick having serial number "9232XG292ZZZ" (i.e. belonging to the second user) is disconnected from a USB port of Node A. | Node A - No memory stick coupled<br>Node B - Memory stick belonging to the first user is coupled |
| Event B5 | 10:13 AM | At Node B - USB memory stick having serial number "XA2312YAFIQ" (i.e. belonging to the first user) is disconnected from a USB port of Node B | Node A - no memory stick coupled<br>Node B - no memory stick coupled |
| Event A5 | 11:33 AM | At Node A - USB memory stick having serial number "XA2312YAFIQ" (i.e. belonging to the first user) is coupled to a USB port of Node A | Node A - Memory stick belonging to the first user is coupled<br>Node B - no memory stick coupled |
| Event A6 | 11:36 AM | Two files are copied from the USB memory stick XA2312YAFIQ (i.e. belonging to the first user) to the node (Node A) - a text file and an MS-Word file | Node A - Memory stick belonging to the first user is coupled<br>Node B - no memory stick coupled |
| Event A7 | 11:39 AM | User operating Node A opens on Node A the MS-Word file that was copied from the USB memory stick | Node A - Memory stick belonging to the first user is coupled<br>Node B - no memory stick coupled |
| Event A8 | 11:43 AM | At Node A - USB memory stick having serial number "XA2312YAFIQ" (i.e. belonging to the first user) is disconnected from a USB port of Node A | Node A - no memory stick coupled<br>Node B - no memory stick coupled |
| Event A9 | 11:48 AM | At Node A - USB memory stick having serial number "9232XG292ZZZ" (i.e. belonging to the second user) is coupled to a USB port of Node A. | Node A - memory stick belonging to second user is coupled<br>Node B - no memory stick is coupled |

Note
the instance of RASM installed on Node A records 9 events in the log file residing on Node A - these events are labelled Events A1-A9. Some of these events are coupling events, some are disconnect events, one of these events (i.e. event A6) is a file-copy event, and another one of these events (i.e. event A7) is a detecting of an opening of an MS-Word file imported to the node from a USB memory stick.

Note
the instance of RASM installed on Node B records 5 events in the log file residing on Node B - these events are labelled Events B1-B5. Some of these events are coupling events, some are disconnect events, and one of these events (i.e. event B4) is a file-copy event.

Broadcast of Data-Requesting Command; Response to Data-Requesting Commands for Example 1

At 11:56 AM, as part of the penetration testing, the remote computing device broadcasts a data-requesting command to Nodes A and B.

At 11:57, Node A responds to this broadcast data-requesting command by transmitting (i.e. via the Internet), to the remote computing device, the Node A-local USB log file including descriptions of Events A1-A9.

At 11:58, Node B responds to this broadcast data-requesting command by transmitting (i.e. via the Internet), to the remote computing device, the Node B-local USB log file including descriptions of Events B1-B5.

Analysis

At 11:59, an analysis required for determining whether there is a method for an attacker to compromise the networked system is performed exclusively at the remote computing device (i.e. by executing code of the penetration testing software module). This analysis which is performed exclusively at the remote computing device is based upon input data comprising the following:
- (i) The "Windows version/update data" for Node A that is transmitted to the remote computing device at 10:01 AM from Node A indicating that Node A is a "strong node";
- (ii) The "Windows version/update data" for Node B that is transmitted to the Remote Computing Device at 10:02 AM from Node B indicating that Node B is a "weak node";
- (iii) The Node A-specific USB log file transmitted to the remote computing device at 11:57 AM from Node A; and
- (iv) The Node B-specific USB log file transmitted to the remote computing device at 11:58 AM from Node B.

This analysis, which is performed exclusively at the remote computing device, is effective to conclude the following:
- (A) It may not be possible for an attacker to compromise Node A via a direct attack, since the OS version is up-to-date and the latest security patches have been installed.
- (B) However, it is possible for an attacker to compromise Node B using a direct attack. The old OS version found to be installed on Node B, which lacks certain security patches, is known (e.g. according to the vulnerabilities knowledge base kept by the penetration testing software module) to be vulnerable to at least one specific attack (e.g. an attack that is able to compromise a node using a known weakness in the SSL protocol, which weakness exists in that old OS version) that would result in the attacker having full control of the node.
- (C) Once Node B is compromised, Node A is exposed to attack because of the uncareful behavior of the first user. The events recorded in the two USB-event log files show that the first user does not refrain from transferring files (including MS-Word files, which are known to be vulnerable to auto-executing poisoned macros) from Node B to Node A using his USB memory stick. Moreover, the first user also does not refrain from opening MS-Word files in Node A after importing them from Node B.
- (D) As a result of the above, the penetration testing software module can now determine that there is a method for an attacker to achieve the goal of the penetration testing campaign—the compromising of Node A. The method to compromise is as follows: (i) directly compromise Node B by a method known for being able to compromise a Windows® workstation lacking the latest two years of security patches, (ii) once compromised, get Node B to download a poisoned macro from the attacker's website and store it on Node B, (iii) From now on, whenever detecting that an MS-Word or an MS-Excel file is being copied from Node B to a USB storage device, poison the copied file in the USB storage device by inserting into it the poisoned macro as an auto-executing macro (a macro that automatically executes when the file is opened). Additionally, a poisoned AUTOEXEC.BAT file that runs upon insertion of a USB storage device into a USB port of a node may also be copied from Node B to the USB storage device, intending that it will executed when the USB storage device is eventually inserted into other nodes (but this should not be the only measure for attacking Node A, as modern versions of operating systems are aware of the threat of AUTOEXEC.BAT file and block its execution from portable storage devices).

Reporting

At 12 noon, the remote computing device sends an email to an email account belonging to the system administrator—the email includes information about the determined method for the attacker to compromise the networked system—see Conclusion "D" above. At this point, the penetration testing campaign, which began at 10 AM, has now concluded.

First observation about Example 1—(i) data from the USB log file of Node A is never present on Node B; (ii) data from the USB log file of Node B is never present on Node A; (iii) in order to determine the method for an attacker to compromise the networked system (i.e. to achieve the goal of the penetration testing campaign), USB log file data from both nodes A and B are required.

Conclusion—Neither the RASM instance on Node A nor the RASM instance on Node B has enough information for determining on its own that Node A can be compromised by an attacker. Only after the information collected by both RASM instances is provided to the penetration testing software module in the remote computing device and analyzed together, it becomes possible to determine the existence of a method for compromising Node A.

Second observation about Example 1—No actual attack is ever performed for validating the vulnerability of Node A, and consequently there is no risk of actually compromising Node A by the testing. Instead, an analysis of actual internal data of some network nodes is performed and an evaluation of the results of the analysis is carried out. This analysis and evaluation are performed entirely at the remote computing device.

Use Case Example 2

Networked System/Penetration Testing System for Example 2:

The second non-limiting example relates to a networked system having the following properties: (i) the networked system comprises a plurality of laptop or desktop workstations, each of which is a network node; (ii) some of the network nodes have access to a shared folder SF which resides on a file-server on one of the nodes ("Node S"); (iii) some of the network nodes have read-only access to the shared folder SF on Node S—i.e. the nodes with read-only access can read files from the shared folder SF but cannot modify these files, and cannot add files to the shared folder SF; (iv) some nodes have both read and write privileges to shared folder SF—these nodes can modify existing files within the shared folder SF and can add new files to shared folder SF, in addition to having read access to shared folder SF; (v) nodes with read-only access and nodes that have both read and write privileges are "nodes having at least read privileges" (vi) nodes having at least read privileges of the folder can import and execute .exe executable files from the shared folder SF, and can import and open MS-Word® files that contain auto-executing macros from the shared folder SF—i.e. content or macros of these files are read into local memory of each such node and executed from the local memory; (vii) a first work-station/node ("Node A") is "strongly defended"—on this work-station/node the most recent version of Windows® is installed including all of the latest security patches; (viii) a second work-station/node ("Node B") is "weakly defended"—on this node, a much older version of Window has been installed, and security patches have not been installed for over two years; (ix) Node A has read-only access to shared folder SF; (x) Node B has both read and write privileges to shared folder SF.

This networked system is subjected to penetration testing.

In this example, a penetration testing software module is installed on a remote computing device which is outside of the networked system—in this example, the remote computing device is deployed in the cloud relative to the networked system, and is in networked communication with the networked system. This particular architecture is illustrated in FIG. 4.

In example 2, the terms "work-station A" and "node A" are used interchangeably. Similarly, the terms "work-station B" and "Node B" are also used interchangeably.

Goal of the Penetration Testing Campaign for Example 2:

In example 2, the goal of the penetration testing campaign is for an attacker to compromise Node A—only if the attacker succeeds to compromise Node B is the penetration testing campaign considered a success.

Timing of the Penetration Testing Campaign for Example 2:

In this second example, the penetration testing campaign commences at 1 PM on Apr. 21, 2017 and concludes at 11 PM on Apr. 21, 2017. Thus, in this example the "Commencement Time" is 1 PM on Apr. 21, 2017. Prior to the Commencement Time, the RASM is pre-installed on each node of the networked system, including Node A which is strongly-defended and Node B which is weakly-defended.

During the ten-hour penetration testing campaign, processor(s) of Node A execute code of the RASM both to ascertain status data of Node A and to "listen" to events which occur at Node A. The status data may include: (i) determining a version of an operating system executing on Node A; (ii) determining which security patches have been installed on Node A; (iii) determining whether or not Node A has read privileges for the shared folder SF; and (iv) determining whether or not Node A has write privileges for the shared folder SF. The events may include execution of an executable by processors of Node A, opening of an MS-word® file or an MS-excel® file (applications which support macros) on Node A, mouse and keyboard events on Node A, reading a file from the shared folder SF (i.e. on Node S) into Node A, execution of a file (or a macro) read from the shared folder SF into Node A.

Similarly, processor(s) of Node B execute code of the RASM both to ascertain status data of Node B and to "listen" to events which occur at Node B.

In this example, at 1:01 PM Node A (i.e. by executing code of the RASM) transmits to the remote computing device "Windows version/update data" for Node A—the Windows version/update data transmitted from Node A indicates that the most recent version of Windows® including all of the latest security patches is installed on Node A.

In this example, at 1:02 PM Node B (i.e. by executing code of the RASM) transmits to the remote computing device "Windows version/update data" for Node B—the Windows® version/update data transmitted from Node B indicates that (i) an older version of Windows® is installed on Node B and (ii) the most recent security patch installed on Node B is over two years old.

In this example, RASM code executing on Node B records the following event—Node B writes an executable file entitled "test.exe" to shared folder SF.

In this example, RASM code executing on Node A records the following events—every 60 minutes (e.g. at 1:30, at 2:30, at 3:30, etc.) Node A reads an executable file named "hourly_test.exe" from shared folder SF and executes it.

Broadcast of Data-Requesting Command; Response to Data-Requesting Commands for Example 2

At 7:56 PM, as part of the penetration testing, the remote computing device broadcasts a data-requesting command to Nodes A and B.

At 7:57 PM, Node A responds to this broadcast data-requesting command by transmitting (i.e. via the Internet), to the remote computing device, the status data and the events data of Node A, both of which are stored in volatile and/or non-volatile storage of Node A.

At 7:58 PM, Node B responds to this broadcast data-requesting command by transmitting (i.e. via the Internet), to the remote computing device, the status data and the events data of Node B, both of which are stored in volatile and/or non-volatile storage of Node B.

Analysis

At 7:59 PM, an analysis required for determining whether there is a method for an attacker to compromise the networked system is performed exclusively at the remote computing device (i.e. by executing code of the penetration testing software module). This analysis which is performed exclusively at the remote computing device is based upon input data comprising the following:
  (i) The "Windows version/update data" for Node A that is transmitted to the remote computing device at 1:01 PM from Node A indicating that Node A is a "strong node";
  (ii) The "Windows version/update data" for Node B that is transmitted to the Remote Computing Device at 1:02 PM from Node B indicating that Node B is a "weak node";
  (iii) The Node A-specific status data and events data transmitted to the remote computing device at 7:57 PM from Node A; and
  (iv) The Node B-specific status data and events data transmitted to the remote computing device at 7:58 PM from Node B.

This analysis, which is performed exclusively at the remote computing device, is effective to conclude the following:
  (A) It may not be possible for an attacker to compromise Node A via a direct attack, since the OS version is up-to-date and the latest security patches have been installed.
  (B) However, it is possible for an attacker to compromise Node B using a direct attack. The old OS version found to be installed on Node B, which lacks certain security patches, is known (e.g. according to the vulnerabilities knowledge base kept by the penetration testing software module) to be vulnerable to at least one specific attack (e.g. an attack that is able to compromise a node using a known weakness in the SSL protocol, which weakness exists in that old OS version) that would result in the attacker having full control of the node.
  (C) Once Node B is compromised, Node A is exposed to attack. In particular, after compromising Node B, an attacker may employ the write privileges of Node B to the shared folder SF by copying into the shared folder SF a poisoned executable file. The reports from Node A indicate that Node A periodically executes a file having that name imported into Node A from the shared folder SF.
  (D) As a result of the above, the penetration testing software module can now determine that there is a method for an attacker to achieve the goal of the penetration testing campaign—the compromising of Node A. The method to compromise is as follows: (i) directly compromise Node B by a method known for being able to compromise a Windows® workstation lacking the latest two years of security patches, (ii) once compromised, get Node B to download a poisoned executable file from the attacker's website and store it on Node B, (iii) In the next time of detecting that Node B writes into the shared folder SF, get Node B to replace the existing executable file "hourly_test.exe" in the shared folder SF by the poisoned file, leaving a poisoned "hourly-test.exe" file in the shared folder.

Reporting

At 8 PM, the remote computing device sends an email to an email account belonging to the system administrator—the email includes information about the determined method for the attacker to compromise the networked system—see Conclusion "D" above. At this point, the penetration testing campaign, which began at 1 PM, has now concluded.

First observation about Example 2—(i) data about the status and events of Node A is never present on Node B; (ii) data about the status and events of Node B is never present on Node A; (iii) in order to determine the method for an attacker to compromise the networked system (i.e. to achieve the goal of the penetration testing campaign), status and events data from both nodes A and B are required.

Conclusion—Neither the RASM instance on Node A nor the RASM instance on Node B has enough information for determining on its own that Node A can be compromised by an attacker. Only after the information collected by both RASM instances is provided to the penetration testing software module in the remote computing device and analyzed together, it becomes possible to determine the existence of a method for compromising Node A.

Second observation about Example 2—No actual attack is ever performed for validating the vulnerability of Node A, and consequently there is no risk of actually compromising Node A by the testing. Instead, an analysis of actual internal data of some network nodes is performed and an evaluation of the results of the analysis is carried out. This analysis and evaluation are performed entirely at the remote computing device.

Use Case Example 3

Networked System/Penetration Testing System for Example 3:

The third non-limiting example relates to a networked system, where email clients are installed on a plurality of the nodes including a first node ("Node A") and a second node ("Node B").

This networked system is subjected to penetration testing.

In this example, a penetration testing software module is installed on a remote computing device which is outside of the networked system—in this example, the remote computing device is deployed in the cloud relative to the networked system, and is in networked communication with the networked system. This particular architecture is illustrated in FIG. 4.

Goal of the Penetration Testing Campaign for Example 3:

In example 3, the goal of the penetration testing campaign is for an attacker to compromise Node B—only if the attacker succeeds to compromise Node B is the penetration testing campaign considered a success.

Timing of the Penetration Testing Campaign for Example 3:

In this third example, the penetration testing campaign commences at 9 AM on May 1, 2017 and concludes at 5 PM on May 2, 2017. Thus, in this example the "Commencement Time" is 9 AM on May 1, 2017. Prior to the Commencement Time (e.g. on Apr. 30, 2017), the RASM is pre-installed on each node of the networked system, including Node A and Node B.

During the thirty two-hour penetration testing campaign, processor(s) of Node A execute code of the RASM to "listen" to activity of Node A (e.g. including activity of the email client, link-clicking events, and other activities) and to store the Node-A-specific activity data of Node A on Node A. Similarly, processor(s) of Node B execute code of the RASM to "listen" to activity of Node B (e.g. including activity of the email client, link-clicking events, and other activities) to store the Node-B-specific activity data of Node B on Node B.

In particular, the RASM instance on Node A records that at 2 PM on May 1, the email client of Node A sends an email including an embedded link to Node B.

The RASM instance on Node B records that at 9:15 AM on May 2, the user of Node B opens the email using the email client of Node B and clicks on the embedded link.

Broadcast of Data-Requesting Command; Response to Data-Requesting Commands for Example 3

At 4:56 PM on May 2, as part of the penetration testing, the remote computing device broadcasts a data-requesting command to Nodes A and B.

At 4:57 PM on May 2, Node A responds to this broadcast data-requesting command by transmitting (i.e. via the Internet), to the remote computing device, the Node A-local data including the activity data specific to Node A.

At 4:58 PM on May 2, Node B responds to this broadcast data-requesting command by transmitting (i.e. via the Internet), to the remote computing device, the Node B-local data including the activity data specific to Node B.

Analysis

At 4:59 PM on May 2, an analysis required for determining whether there is a method for an attacker to compromise the networked system is performed exclusively at the remote computing device (i.e. by executing code of the penetration testing software module). This analysis which is performed exclusively at the remote computing device is based upon input data comprising the following:
  (A) Node A is known to send emails to Node B;
  (B) The user of Node B is known to open emails received from Node A and to click on embedded links appearing in those emails;
  (C) Results of additional analysis performed on the remote computing device (i.e. using input data including input data from the RASM instance(s)) indicate that Node A gets compromised during the penetration testing campaign;

This analysis, which is performed exclusively at the remote computing device, is effective to conclude the following:
  (A) Since Node A can get compromised, an attacker may take control of Node A and embed poisoned links (i.e. linking to a poisoned executable residing on the cloud on the attacker's server) into outgoing emails sent from the email client on Node A;
  (B) Node B is exposed to attack because of the uncareful behavior of the user of Node B—i.e. the user of Node B is known to click on links received in emails coming from Node A. The method of compromising Node B is to first compromise Node A, and then to embed in outgoing emails leaving the email client of Node A poisonous links.

Reporting

At 5 PM on May 2, the remote computing device sends an email to an email account belonging to the system administrator—the email includes information about the determined method for the attacker to compromise the networked system—see Conclusion "B" above. At this point, the penetration testing campaign, which began at 9 AM on May 1, has now concluded.

First observation about Example 3—(i) data about the status and events of Node A is never present on Node B; (ii) data about the status and events of Node B is never present on Node A; (iii) in order to determine the method for an attacker to compromise the networked system (i.e. to achieve the goal of the penetration testing campaign, which in this example is the compromising of Node B), status and events data from Node B are required. However, in this example events data from Node A are not necessarily required for determining the method for an attacker to compromise the networked system—once the remote computing device learns from Node B reports that the user of Node B does not refrain from clicking links embedded in emails received from Node A, it knows that Node B can be compromised if Node A is first compromised. Note that even though Node A may report events of sending emails with embedded links to Node B, the remote computing device may make its determination even without relying on those reported events. However, the remote computing device still needs to know that Node A can be compromised, for example by utilizing a known weakness in its version of operating system, and therefore some status reports from Node A may still be required for making the determination.

Conclusion—Neither the RASM instance on Node A nor the RASM instance on Node B has enough information for determining on its own that Node A can be compromised by an attacker. Even though the RASM instance of Node B can determine that Node B can be compromised if Node A is already compromised, it cannot know whether Node A can be compromised. Only when the information collected by both RASM instances is provided to the penetration testing software module in the remote computing device and analyzed together, it becomes possible to determine the existence of a method for compromising Node B.

Second observation about Example 3—As was the case in Examples 1 and 2, no actual attack is ever performed for validating the vulnerability of Node A, and consequently there is no risk of actually compromising Node A by the testing. Instead, an analysis of actual internal data of some network nodes is performed and an evaluation of the results of the analysis is carried out. This analysis and evaluation are performed entirely at the remote computing device.

A Discussion of FIGS. 3-6

Embodiments of the invention relate to penetration testing of networked systems, such as that illustrated in FIG. 3.

Embodiments of the invention are described below with reference to a networked system of an organization which contains multiple network nodes. The nodes of the networked system may be of different types—different computer hardware, different operating systems, different applications, different resources (printers, communications devices, etc.), etc.

FIG. 4-5 illustrate examples of penetration testing systems according to embodiments of the invention. In each of these examples, the penetration testing system comprises a penetration testing software module (PTSM) 260 installed on a remote computing device and a reconnaissance agent software module (RASM) 270 installed on at least some network nodes of the networked system 200.

In the example of FIG. 4, the remote computing device (i.e. on which the PTSM 260 is installed) is first NS-external node 254 which is in communication with the networked system 200 by an Internet connection. In the example of FIG. 5, the remote computing device (i.e. on which the PTSM 260 is installed) is second NS-external node 252 which is in communication with the networked system 200 via a local-area network (LAN).

As noted above, any network node on which the RASM is installed is defined as a RASM-hosting network node. Thus, in the example of FIGS. 4-5, only the following nodes are RASM-hosting network nodes: N104, N016, N102, N103, N108, N116 and N117.

As will be discussed below, in embodiments of the invention, PTSM 260 and RASM 270 cooperate to collectively subject the networked system 200 to penetration testing. In different embodiments of the invention, the penetration testing test may be performed according to the methods described in any of FIGS. 6, 7, 8A-8B, 10A-10C, and/or 11A-11C.

For example, the penetration testing of the networked system 200 (i.e. performed by execution of PTSM 260 and RASM 270 on their respective hosts) may include both of the following operations: (i) collecting internal data by the RASM 270 of two or more network nodes of networked system 200 (e.g. each RASM 270 collects respective internal data of its RASM-hosting network node and transmits this internal data to the PTSM 260); and (ii) analyzing this data by the PTSM 260 to determine a method for the attacker to compromise the networked system 200.

FIG. 6 illustrates an example where PTSM 260 is installed on a physically remote computing device 350; and the RASM is installed on each node 300[$i$] of a set of N network-nodes, {300[1], 300[2], . . . 300[N]} where N is a positive integer (N≥2), and i is an index that runs between 1 and N. Each node 300[$i$] corresponds to a different node of networked system 200.

The label 350 for the remote computing device refers to any remote computing device on which the PTSM 260 is installed. As noted above, for the example of FIG. 4, remote computing device 350 corresponds to the first NS-external node 254 while in the example of FIG. 5, remote computing device 350 corresponds to node 252.

Thus, in the example of FIG. 6, node 300[1] (e.g. in particular, the instance of RASM 270 which is installed on node 300[1]) receives one or more data-requesting commands from remote computing device 350 (e.g. data-requesting commands issued by PTSM 260—i.e. when processor(s) of remote computer device 350 execute code of PTSM 260).

Each RASM-hosting network node 300[$i$] executes code of RASM 270. Execution of code of RASM 270 by one or more processor(s) of each RASM-hosting network node 300[$i$]: (i) obtains respective internal data specific to RASM-hosting network node 300[$i$]; and (ii) respectively transmits the internal data to the remote computing device 350 (e.g. to PTSM 260 executing on remote computing device 350).

Thus, execution by RASM-hosting network node 300[1] of code of RASM 270: (i) obtains internal data specific to node 300[i]; (ii) transmits, to remote computing device 350, the internal data specific to node 300[1]. Execution by RASM-hosting network node 300[2] of code of RASM 270: (i) obtains internal data specific to node 300[2]; (ii) transmits, to remote computing device 350, the internal data specific to node 300[2]. And so on.

The internal data specific to RASM-hosting network node 300[i] (i.e. i is an index that runs between 1 and N) includes data about at least one of: A. an internal event of the RASM-hosting network node 300[i], B. an internal condition of the RASM-hosting network node 300[i], and C. an internal fact of the RASM-hosting network node 300[i].

In the specific example of FIG. 6, the RASM-hosting network node 300[i] may obtain the internal data and/or transmit the internal data in response to data-requesting command(s) received by the RASM-hosting network node 300[i] from the remote computing device 350. For example, the obtaining of the internal data and/or the transmitting thereof may only occur if the data-requesting command(s) is received by the RASM-hosting network node 300[i].

A Discussion of FIG. 7

FIG. 7 is a flow-chart of a method of penetration testing that is performed to enforce both of the following two rules:

First Rule—according to the first rule, all of the analyzing of the internal data for determining the method for the attacker to compromise the networked system is performed by the remote computing device rather than at the RASM-hosting nodes.

In some embodiments, this may be useful, for example, for minimizing the CPU burden of penetration testing imposed on each of the nodes of the penetration-tested networked system. Alternatively or additionally, this may be useful for updating—e.g. when new threats need to be added to a threat-database, there is no need to update this threat-database on each of the nodes. Instead, the threat-database may be updated only on the remote computing device.

Second Rule—in contrast to penetration testing systems in which the nodes of the networked system 200 are subjected to an actual attack, no network node of the networked system is ever put at risk of being compromised by the executing of the penetration test.

In embodiments of the invention, even though no network node is put at risk ("Second Rule"), thanks to the RASM 270 installed on a plurality of nodes 300[i] of the networked system, the penetration testing may be performed in a manner which accurately reflects the current status of the networked system.

Thus, FIG. 7 is a method for executing a penetration test of a networked system by a penetration testing system so as to determine, while enforcing first and second rules, a method for an attacker to compromise the networked system, where the penetration testing system comprises (A) a penetration testing software module installed on a remote computing device and (B) a reconnaissance agent software module (RASM) installed on at least some network nodes of the networked system so that each network node of the networked system on which the RASM is installed is defined as a RASM-hosting network node.

The method of FIG. 7 comprises the following steps:

Step S201—step S201 includes obtaining, by each given RASM-hosting network node 300[i] (i.e. i is an index that runs between 1 and N) of one or more RASM-hosting network nodes of networked system 200, respective internal data of the given RASM-hosting network node 300[i]. The obtaining of step S201 comprises executing computer code of the RASM 270 by one or more processors of the given RASM-hosting network node 300[i].

The respective internal data (i.e. related to node 300[i]) includes data about at least one of: A. an internal event of the given RASM-hosting network node 300[i], B. an internal condition of the given RASM-hosting network node 300[i], and C. an internal fact of the given RASM-hosting network node 300[i].

In some embodiments, for at least one of the RASM-hosting network nodes, step S201 is performed in response to a data-requesting command received by the RASM-hosting network node from the remote computing device. In other embodiments, the RASM executing on the RASM-hosting network node may not require a data-requesting command—for example, the RASM may periodically (e.g. once every minute) update a log of internal data stored in volatile or non-volatile memory of the RASM-hosting network node.

Step S205—step S205 includes transmitting to the remote computing device 350 (e.g. 254 of FIG. 4 or 252 of FIG. 5 or 290 of FIG. 9), by each given RASM-hosting network node 300[i] of the one or more RASM-hosting network nodes of networked system 200, the obtained respective internal data of the given RASM-hosting network node 300[i]. The transmitting of step S205 comprises executing computer code of the RASM by the one or more processors of the given RASM-hosting network node 300[i].

In some embodiments, for at least one of the RASM-hosting network nodes, step S205 is performed in response to a data-requesting command received by the RASM-hosting network node from the remote computing device. In other embodiments, the RASM executing on the RASM-hosting network node may not require a data-requesting command—for example, the RASM may be programmed to periodically (e.g. once every minute) transmit internal data stored in volatile or non-volatile memory of the RASM-hosting network node from the RASM-hosting network node to the remote computing device.

Step S209—step S209 includes analyzing, by the remote computing device 350 (e.g. 254 of FIG. 4 or 252 of FIG. 5 or 290 of FIG. 9), the internal data transmitted (i.e. in step S205) by at least one RASM-hosting network nodes 300[i] of the one or more RASM-hosting network nodes. The analyzing of step S209 is performed so as to determine the method for the attacker to compromise the networked system 200. The analyzing of step S209 comprises executing computer code of the penetration testing software module 260 by one or more processors of the remote computing device (e.g. 254 of FIG. 4 or 252 of FIG. 5 or 290 of FIG. 9).

Step S213—step S213 includes reporting, by the penetration testing system the method for the attacker to compromise the networked system 200. The reporting may comprise executing computer code of the PTSM 260 by the one or more processors of the remote computing device 350 (e.g. 254 of FIG. 4 or 252 of FIG. 5 or 290 of FIG. 9). The reporting may comprise at least one of:

(i) causing a display device [NOT SHOWN—e.g. an LCD screen or any other electronic display device] to display a report including information about the determined method for the attacker to compromise the networked system, (ii) recording the report including the information about the determined method for the attacker to compromise the networked system in a file, and (iii) electronically transmitting the report including the information about the determined method for the attacker to compromise the networked system.

In different examples, the information about the determined method for the attacker to compromise the system may comprise one or more of: (i) information about a method for compromising one network node of the networked system (ii) information about one or more network nodes of the networked system which are vulnerable to attack, (iii) information about one or more resources of the networked system that could be damaged or exported out of the networked system by an attacker, and (iv) information about an ordered list of network nodes of the networked system, wherein an attacker could use a specific network node in said ordered list that is already compromised as a basis for compromising another network node that immediately follows said specific network node in said ordered list.

Figure 9:
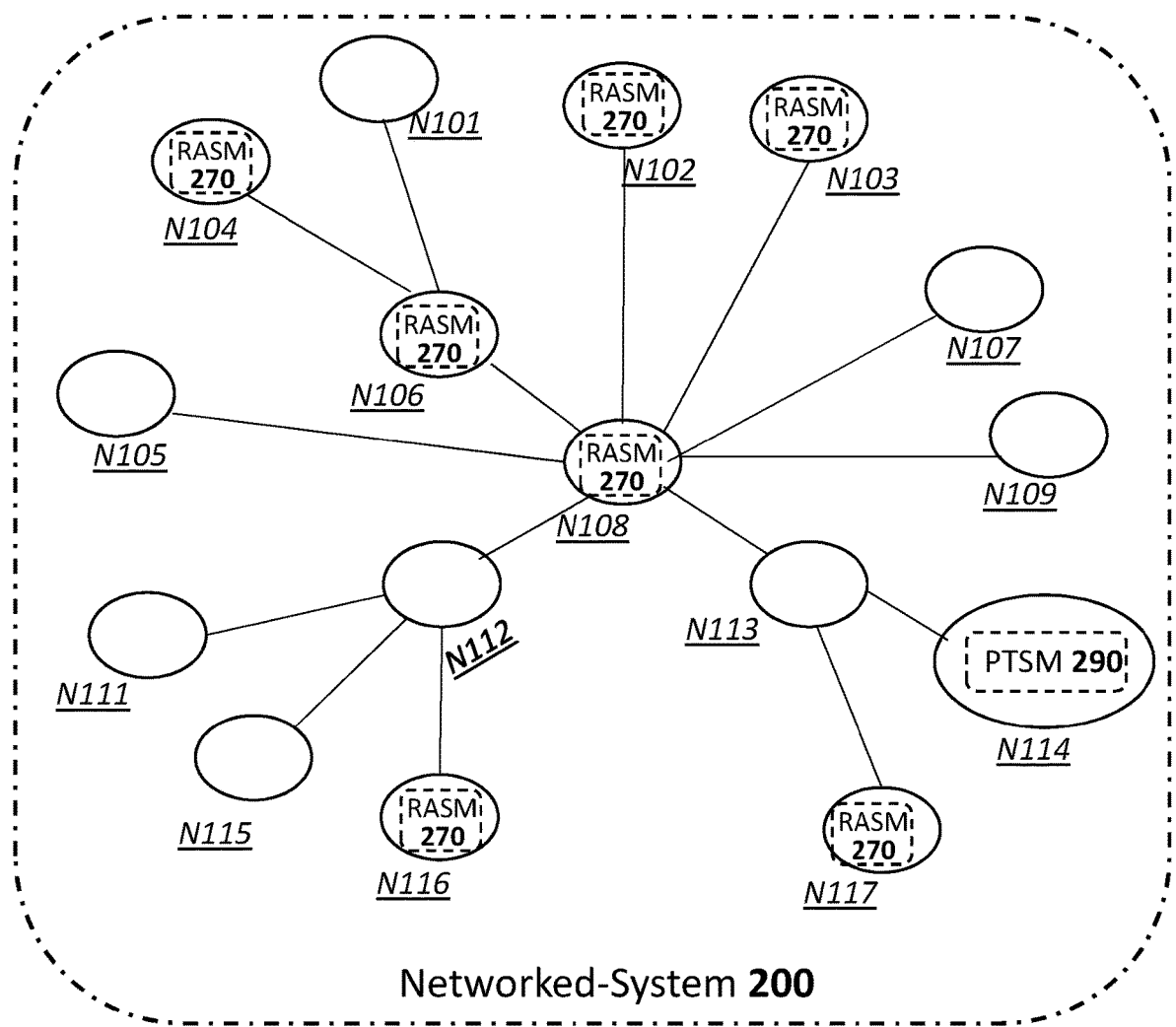
Figure 10C:
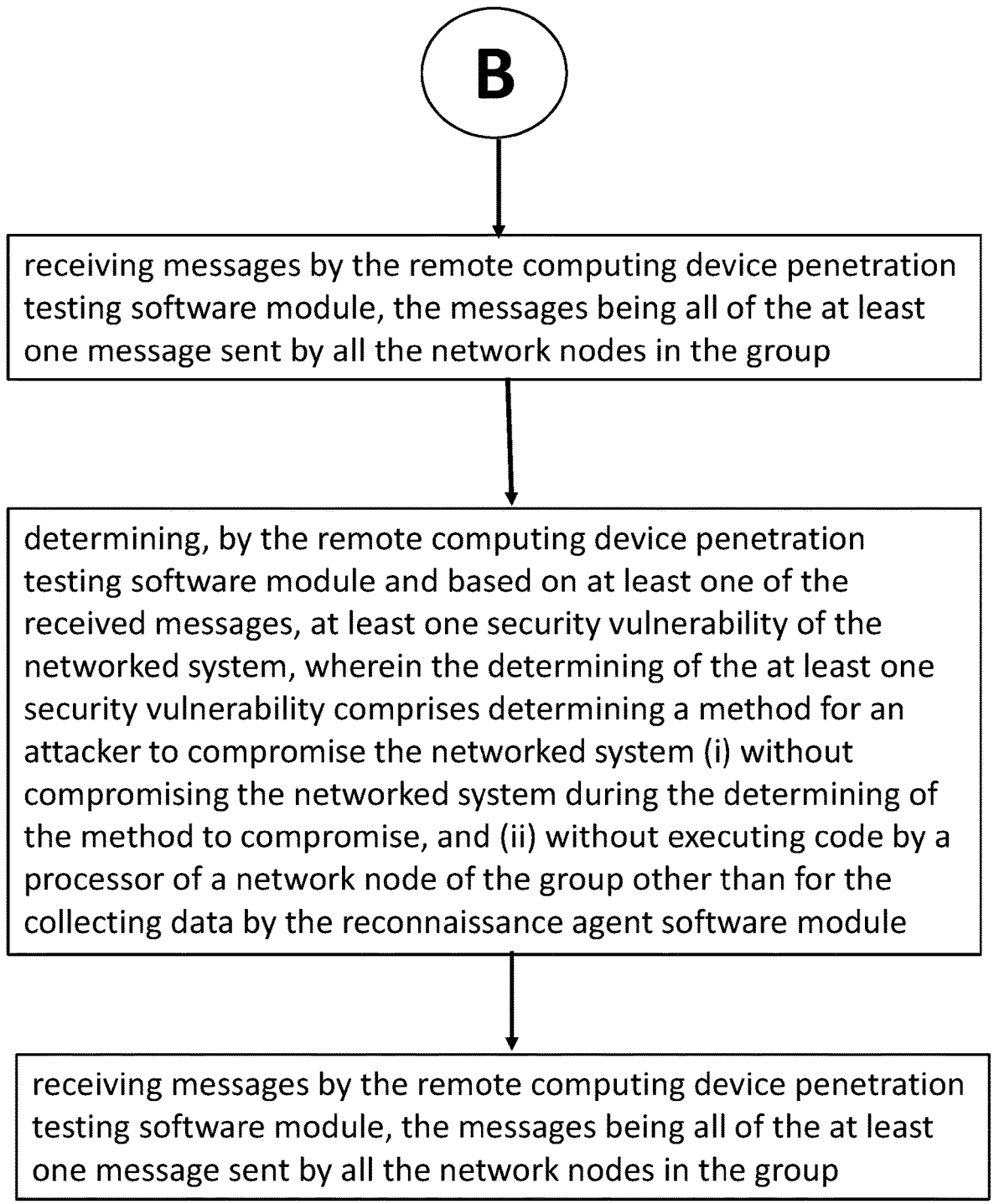
Figure 11B:
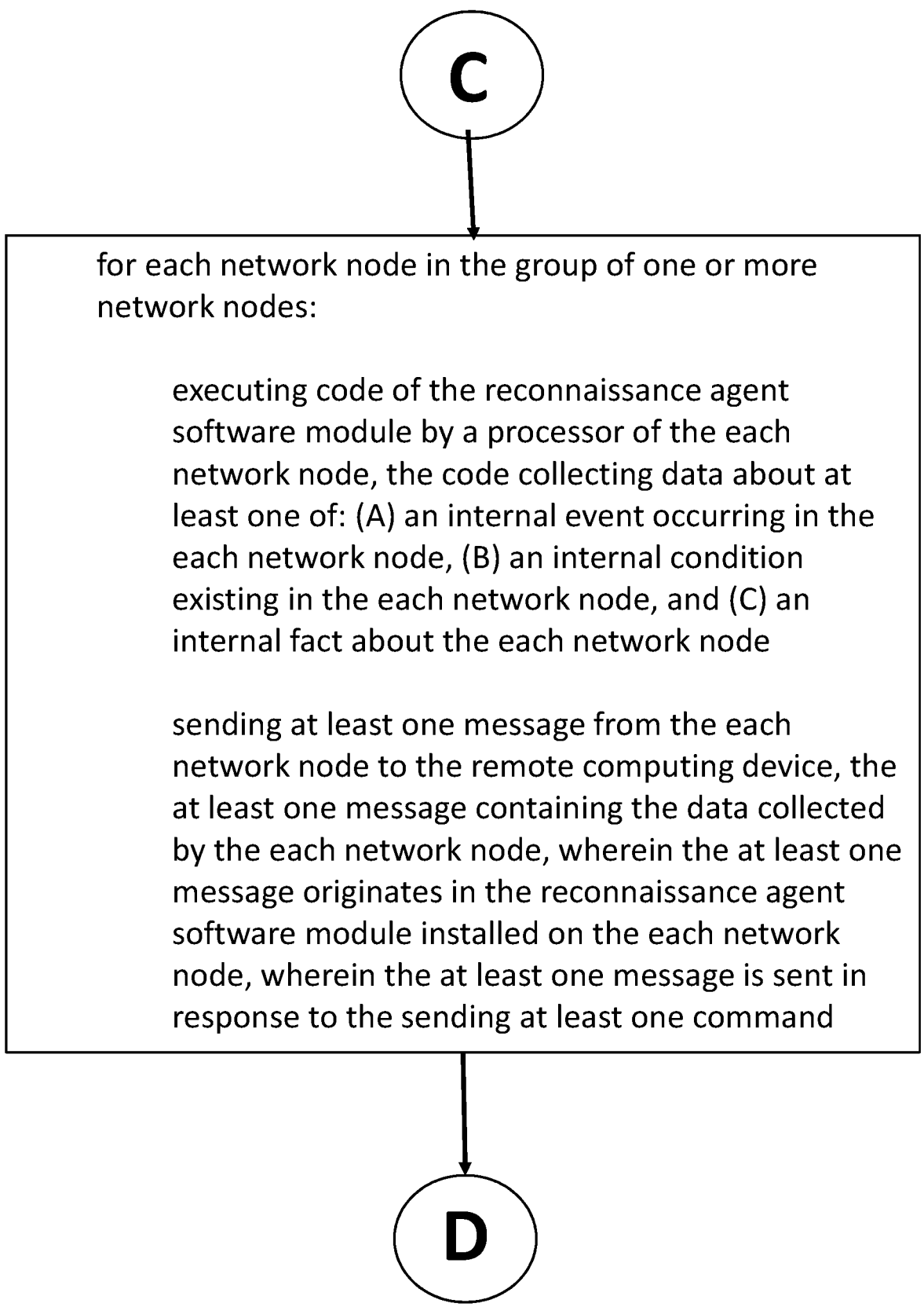
Figure 11C:
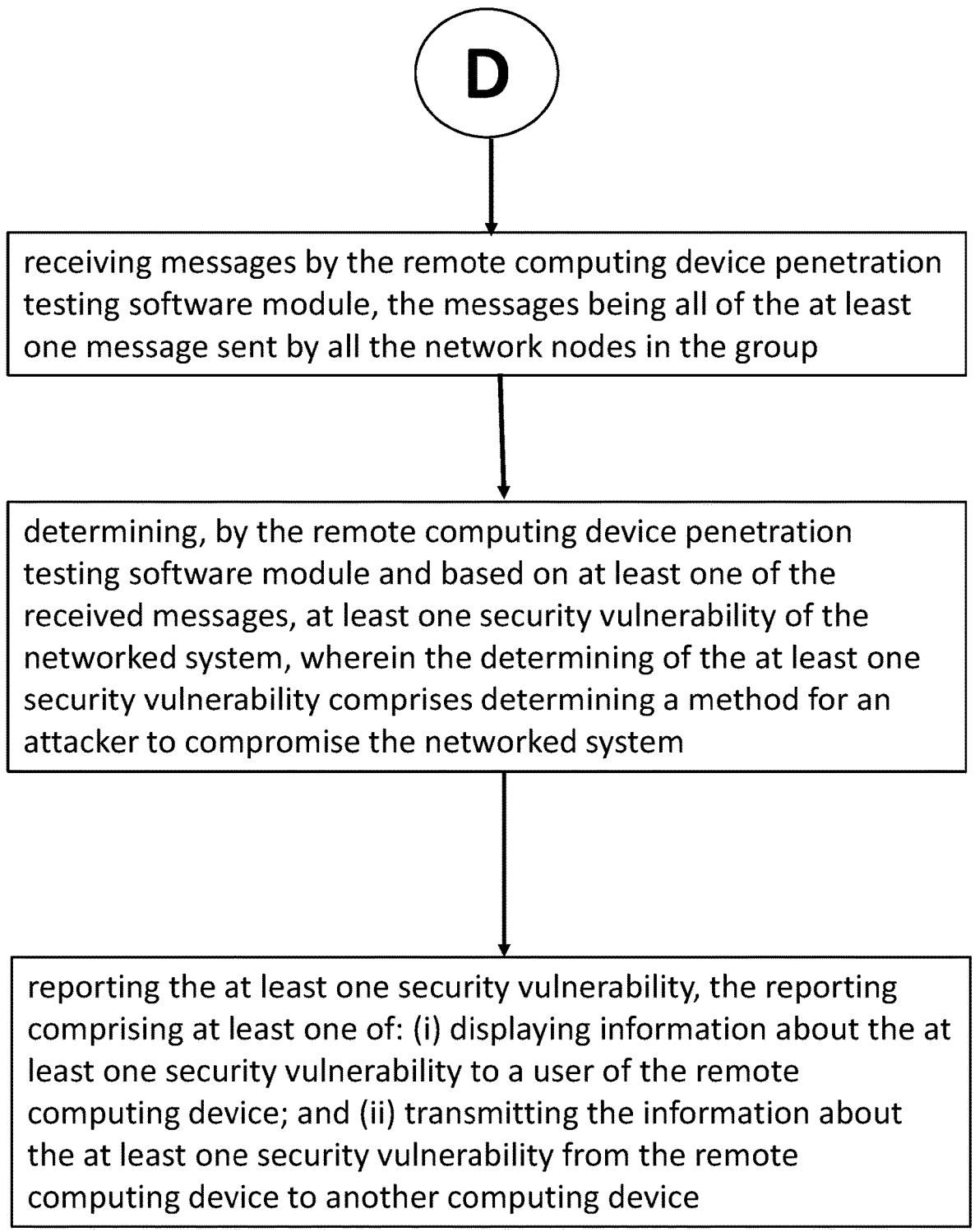

In some embodiments, each given RASM-hosting network node 300[$i$] of the one or more RASM-hosting network nodes performs at least one of step S201 and step S205 in response to a receiving (i.e. by the RASM-hosting network node 300[$i$]) of one or more data-requesting commands (e.g. see FIG. 6) from the remote computing device 350 (e.g. 254 of FIG. 4 or 252 of FIG. 5 or 290 of FIG. 9).

Figure 8A:
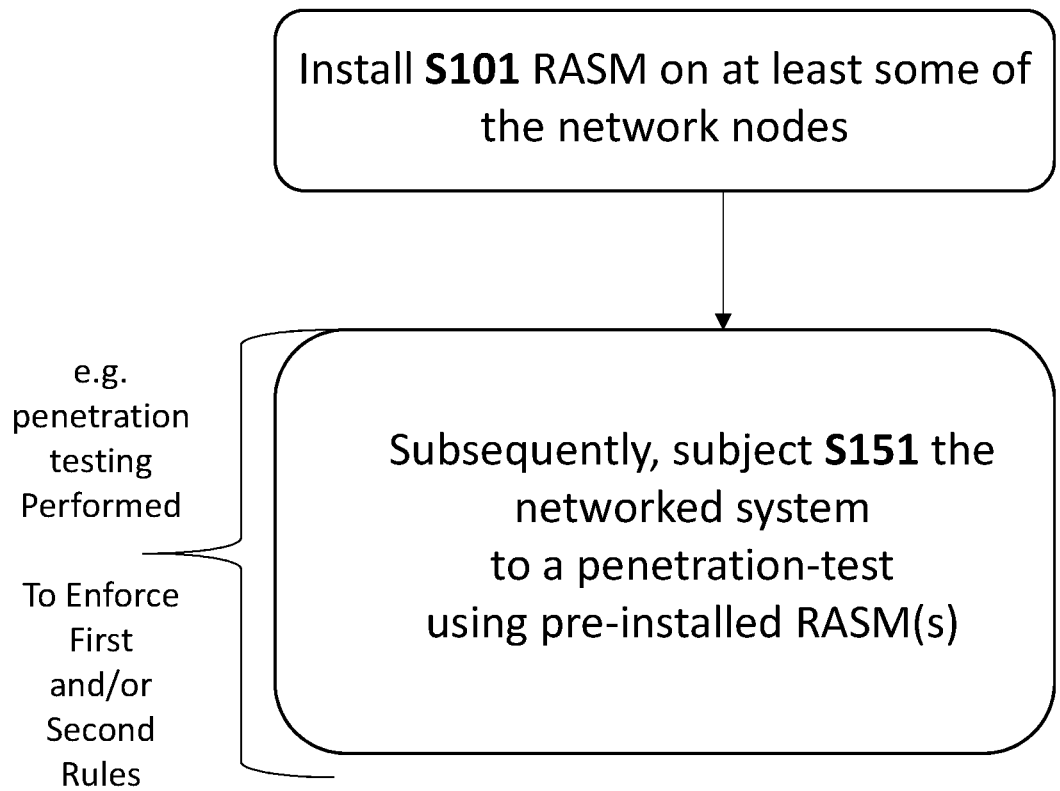
Figure 8B:
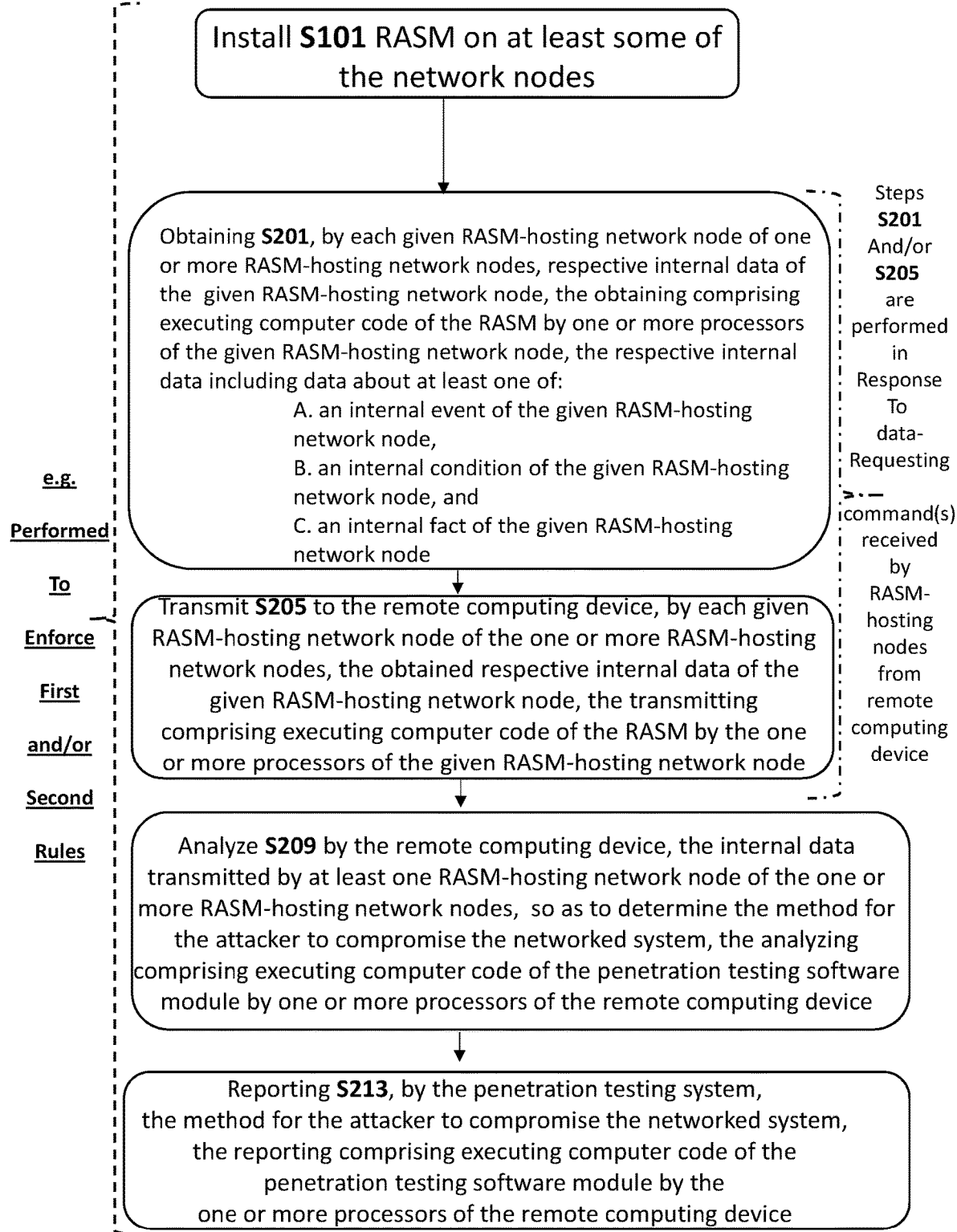

Discussion of FIGS. 8A-8B

Reference is now made to FIG. 8A. In some embodiments, instead of a situation where all RASM instances 270 are installed on the network nodes after the penetration test has commenced, the method may be performed such that one or more RASM instances 270 are pre-installed (i.e. in step S101) on at least some of (e.g. on all of) the RASM-hosting network nodes 300[$i$] prior to beginning of the execution of the penetration test. According to the example of FIG. 8A, only after the one or more (e.g. at least some of, or all of) of the RASM instances 270 are installed on one or more RASM-hosting network nodes 300[$i$] does the penetration test begin. In step S151, the networked system 200 is subjected to a penetration test using the one or more pre-installed RASM instances.

Alternatively or additionally, and as shown in FIG. 8B, the method of FIG. 8A may be performed in a manner that enforces at least one of: (i) a first rule and (ii) a second rule. According to the first rule, all of the analyzing of the internal data (i.e. from the RASM-hosting nodes 300[$i$]) for determining the method for the attacker to compromise the networked system 200 is performed by the remote computing device 350 of FIG. 6 (e.g. 254 of FIG. 4 or 252 of FIG. 5 or 290 of FIG. 9).

According to the second rule, no network node of the networked system 200 is ever put at risk of being compromised by the executing of the penetration test.

In some embodiments, the method of FIG. 8B is performed to enforce only the first rule and not the second rule. In some embodiments, the method of FIG. 8B is performed to enforce only the second rule and not the first rule. In some embodiments, the method of FIG. 8B is performed to enforce both the first and the second rules.

A Discussion of FIG. 9

FIGS. 4-5 and 9 illustrate examples of penetration testing systems where a reconnaissance agent software module (RASM) is installed on multiple nodes of the networked system, where the RASM together with a penetration testing software module (PTSM) subject the networked system to penetration testing.

In the example of FIG. 9, the remote computing device (i.e. on which the PTSM 260 is installed) is one of the nodes of the networked system 200—in this case node N114. For example, PTSM 290 may run on a virtual machine installed on top of the Operating System of node N114. Optionally, no RASM 270 is installed on the node N114.

FIGS. 4-5 and 9 illustrate examples of penetration testing systems where a reconnaissance agent software module (RASM) is installed on multiple nodes of the networked system, where the RASM together with a penetration testing software module (PTSM) subject the networked system to penetration testing.

A Discussion of FIGS. 10A-10C and 11A-11C

It is noted that FIGS. 10A-10C and 11A-11C relate to two different methods of penetration testing. However, the skilled artisan will appreciate that in some embodiments, features of these two methods may be combined.

Embodiments of the invention relate to a method of testing a networked system by a reconnaissance agent penetration testing system and include the following steps.

In a first step the penetration testing software module is installed on a remote computing device. The remote computing device may be a server located outside the tested networked system and owned by a different company than the organization owning the tested networked system. In such case the server is typically owned by a company which provides the testing as a service, including providing the penetration testing tool. Alternatively, the remote computing device may be a server located outside the tested networked system and owned by the organization owning the tested networked system or the remote computing device may be a cloud computing resource operating in the service of the organization owning the tested networked system. In such cases the testing is typically carried out by the organization owning the tested networked system, which may obtain the penetration testing tool from an external source or develop it in-house. Alternatively, the remote computing device may be a network node of the tested networked system.

In all the above alternatives, the remote computing device may be a dedicated computing device that is dedicated only to the penetration testing process or it may be a non-dedicated computing device that also performs other functionality in addition to the penetration testing process. The penetration testing software module may be installed from scratch for each new penetration test, but typically it is persistently installed on the remote computing device and is not uninstalled or otherwise removed between tests.

In a second step, the reconnaissance agent is installed on multiple network nodes of the tested networked system. The network nodes on which the reconnaissance agent is installed are typically all the network nodes of the portion of the networked system that is tested in the current test. That portion may be the full tested networked system or only a subset of it. For example, in a large company the current test may be directed only to the sales organizational unit, in which case only network nodes belonging to the sales organizational unit get installed with the reconnaissance agent. The installation of the reconnaissance agent on a network node may be either persistent or non-persistent.

In a third step, initial conditions are set for the test. The initial conditions include an identification of which of the network nodes of the tested networked system should be assumed to be already compromised at the beginning of the test. The list of network nodes assumed to be already compromised at the beginning of the test may include zero, one or multiple network nodes. Other initial conditions for the test may also be set. For example, the type and capabilities of the attacker against whom the testing process should run the test, the goals of the attacker in his current attack, etc.

In a fourth step the reconnaissance function is started. This function collects data about the tested networked system, and optionally also other types of data such as business intelligence data about the organization owning the tested networked system. The collection of data about the tested networked system includes at least the following sub-steps.

In a first sub-step of the fourth step, at least one command is sent from the remote computing device to a group of one or more of the network nodes on which the reconnaissance agent is installed. The at least one command originates from the penetration testing software module and is received by the respective reconnaissance agent installed on each addressed network node. The at least one command instructs each of the receiving instances of the reconnaissance agent to collect internal data about the network node hosting it. The at least one command may also instruct each of the receiving instances of the reconnaissance agent to collect other data about the networked system, which is not internal data of the network node on which that instance of the reconnaissance agent is installed.

In a second sub-step of the fourth step, each instance of the reconnaissance agent that received the at least one command collects internal data of the network node on which it is installed, and possibly also other data about the tested networked system.

In a third sub-step of the fourth step, each network node that received the at least one command sends one or more messages to the remote computing device. The one or more messages sent by a network node originate in the corresponding reconnaissance agent installed on that network node. Each message contains data collected by the corresponding instance of the reconnaissance agent installed on the network node that sent it.

In a fifth step the one or more messages of all sending network nodes are received by the penetration testing software module.

In a sixth step, the attack function is started. The penetration testing software module determines, based on data contained in at least one of the messages received from one of the network nodes and based on the current state of the list of already compromised network nodes, whether a network node that was previously not included in the list of already compromised network nodes can now be compromised and should be added to the list. Typically, but not necessarily, the determination of which network node will be the next one to be added to the list is based on data contained in multiple messages received from multiple network nodes, and possibly on data contained in all messages received from all sending network nodes.

A network node is determined to be compromiseable by an attacker if the attack function determines that an attacker can successfully cause execution of an operation in the network node that is not allowed for the attacker by the rules defined by an administrator of the network node or can successfully cause execution of an operation in a software module of the network node that was not predicted by the vendor of the software module. The determination that a new network node can now be compromised is achieved without risking compromising the networked system. That is—the determination is achieved by simulation or by some other method of evaluation, for example by relying on one or more databases that store knowledge about known methods of compromising networks or computing devices. The determination does not attempt to verify an assessment that a given operation or sequence of operations may successfully compromise the network node by actually performing the operation or sequence of operations and then checking if the network node was compromised or not.

In a seventh step, the fourth, fifth and sixth steps are iteratively repeated. In each iteration one or more commands are sent to one or more network nodes, internal data is collected in the addressed network nodes, one or more messages are sent from each of the addressed network nodes to the remote computing device, and the penetration testing software module determines whether a new network node can be compromised and should be added to the list of already compromised networked nodes, all that done without risking compromising the tested networked system. The determination of which network node will be the next one to be added to the list may be based not only on messages received during the present iteration, but also on messages received during previous iterations. The iterations continue until one of: (i) the attack function determines that a security vulnerability exists in the tested networked system and that vulnerability might be utilized by an attacker for the disadvantage of the organization owning the tested networked system or of a user of one of the network nodes, or (ii) the penetration testing system gives up on finding a security vulnerability in the tested networked system.

In an eighth step, if the attack function had determined that a security vulnerability exists in the tested networked system, the reporting function generates at least one report based on the identified vulnerability and possibly also based on additional data prepared by the attack function. The at least one report contains at least one of (i) a list of network nodes which are vulnerable to attack. The list may include network nodes that are not directly subject to attack from outside the networked system, but can be compromised after other network nodes in their vicinity are compromised, (ii) a damage assessment including a list of resources in the networked system that could be damaged or exported out of the networked system by an attacker. The damaged or exported resources may be files that might be corrupted or deleted by an attacker, files that might be exported out of the networked system by an attacker, peripheral devices that might be shut-down by an attacker, etc. Additionally, a damage assessment may include a list of services provided to employees of the organization or to outside customers that might fail to operate, (iii) a trajectory (an ordered list of network nodes) across the networked system according to which an attacker could advance by using a network node that was already compromised as a basis for compromising the next network node in the list.

If the attack function had determined that multiple security vulnerabilities exist in the tested networked system, the reporting function generates at least one report according to the above for each vulnerability.

If the attack function had determined that no security vulnerability could be found, the reporting function generates a report saying so.

In a ninth step, any reports generated in the previous step are output by the reporting function. A report may be output to a screen of a network node, output to a screen of the remote computing device, sent by mail to one or more network nodes, sent by mail to the remote computing device, sent by mail to a predefined address, sent by any delivery method to any destination, or any combination of the above. Typically, the reports are addressed to the CISO of the organization owning the tested networked system or to its administrator.

Once the components of the penetration testing system are installed (see the first and second steps), the above other steps are carried out automatically. As explained in the third step above, a user who initiates a test does it by first defining parameters for the testing process—the portion of the network to be covered in the test, types of threats that have to be taken into account, initial network nodes that are assumed to be already compromised by the attacker when the test starts, etc. The rest of the penetration testing process then proceeds without human intervention until the report(s) are presented or sent out.

The proposed reconnaissance agent penetration testing system eliminates the deficiencies of the prior art penetration testing systems described above. The collection of internal data of network nodes is achieved by installing instances of the reconnaissance agent on network nodes of the tested networked system. The installation is done prior to starting the test and in consent and cooperation with the organization owning the tested networked system. The code of the reconnaissance agent is executed by a processor of each network node on which it is installed and therefore has direct access to all internal data of the hosting network node. If issues of access rights are raised for the reconnaissance agent then they can be resolved ahead of the test by the networked system's administrator by either allocating the reconnaissance agent higher access rights or deciding that certain internal data will not be used by the test.

Definitions

This disclosure should be interpreted according to the definitions below. In case of a contradiction between the definitions in this Definitions section and other sections of this disclosure, this section should prevail. In case of a contradiction between the definitions in this section and a definition or a description in any other document, including in another document incorporated in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.
2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.
3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.
4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.
5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.
6. "network node of a networked system" or "node of a networked system"—Any computing device or peripheral device that belongs to the networked system.
7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).
8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system. The validation of the vulnerability may be achieved by actively attempting to compromise the given network node or the given networked system and then checking if the compromising attempt was successful. Such validation is referred to as "active validation".

Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation".

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported. Unlike the cyclic nature of a vulnerability management process, a penetration test has a starting point and an ending point which bound it on the time axis. Also unlike a vulnerability management process which operates at the level of isolated vulnerabilities of individual network nodes, a penetration test may operate at a higher level which considers vulnerabilities of multiple network nodes that might be jointly used by an attacker to compromise the networked system. A penetration testing process involves at least the following functions: (i) a reconnaissance function, (ii) an attack function, and (ii) a reporting function. It should be noted that the above functions do not necessarily operate sequentially according to the above order, but may operate in parallel or in an interleaved mode. Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system. The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (ii) electronically transmitting a report including information about the results of the penetration testing. The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign"—A specific run of a specific test of a specific networked system by the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.

An information item of a campaign is either a primary information item of the campaign or a secondary information item of the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy. A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

21. "primary information item of a campaign"—An information item of the campaign which is completely independent of previously selected values of other information items of the campaign. In other words, the options available to a user for selecting the value of a primary information item of the campaign are not dependent on any value previously selected for any another information item of the campaign. For example, the options available to the user for selecting a goal of the attacker are independent of values previously selected for any other information item of the campaign, and therefore the goal of the attacker is a primary information item of the campaign.

22. "secondary information item of a campaign"—An information item of the campaign which depends on at least one previously selected value of another information item of the campaign. In other words, the options available to a user for selecting the value of a secondary information item of the campaign depend on at least one value previously selected for another information item of the campaign. For example, the options available to the user for selecting a capability of an attacker may depend on the previously selected value of the type of the attacker. For a first type of attacker the available capabilities to select from may be a first group of capabilities, while for a second type of attacker the available capabilities to select from may be a second group of capabilities, different from the first group. Therefore, a capability of the attacker is a secondary information item of the campaign.

23. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.

24. "pre-defined scenario", "scenario template" or "template scenario"—A scenario that exists in storage accessible to a penetration testing system before the time a campaign is started, and can be selected by a user of the penetration testing system for defining a campaign of penetration testing.

A pre-defined scenario may be created and provided by the provider of the penetration testing system and may be part of a library of multiple pre-defined scenarios. Alternatively, a pre-defined scenario may be created by the user of the penetration testing system using a scenario editor provided by the provider of the penetration testing system.

A penetration testing system may require that a campaign of penetration testing that is based on a pre-defined scenario must have all its values of information items taken from the pre-defined scenario, with no exceptions. Alternatively, a penetration testing system may allow a user to select a pre-defined scenario and then override and change one or more values of information items of a campaign that is based on the pre-defined scenario.

25. "attacker" or "threat actor"—An entity, whether a single person, a group of persons or an organization, that might conduct an attack against a networked system by penetrating it for uncovering its security vulnerabilities and/or for compromising it.

26. "a type of an attacker"—A classification of the attacker that indicates its main incentive in conducting attacks of networked systems. Typical values for a type of an attacker are state-sponsored, opportunistic cyber criminal, organized cyber criminal and insider. An attacker can have only a single type.

27. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities. An attacker can have one or multiple capabilities.

28. "a method of a capability"—A combination of (i) an algorithm for implementing the capability, and (ii) a required condition for the capability to be applicable and feasible for an attacker having that capability. For example, an opportunistic cyber-criminal may have the knowledge of forcing RCE (Remote Code Execution) in a browser of a targeted network node using a simple and well-known algorithm, but that algorithm is only applicable when the browser is an old version of IE (Internet Explorer) not higher than a specific version number. On the other hand, a state-sponsored attacker may have the knowledge of forcing RCE using a complex and sophisticated algorithm, that algorithm being applicable to every type of browser and every version of it. The two attackers both have the same capability of forcing RCE for browsers, but have different methods for that capability—for one attacker the RCE capability is implemented by a first method which is limited to a certain subclass of browsers, while for the other attacker the RCE capability is implemented by a second method which is applicable to all browsers. The condition of a method may be the trivial condition that is always satisfied, as is demonstrated in the above example in which a state-sponsored attacker has an RCE capability with an always-true condition. A capability can have one or multiple methods.

29. "a goal of an attacker"—What the attacker of a campaign is trying to achieve when attacking a targeted networked system. In other words, what is the criterion according to which it will be judged whether the attack was a success or a failure and/or to what extent was it a success or a failure. Selecting a type of an attacker may cause a default selection of a goal for that attacker, but the user may have an option to override the default selection. An attacker can have one or multiple goals.

30. "a lateral movement strategy of an attacker"—A decision logic applied by the attacker of a campaign for selecting the next network node to try to compromise. During a penetration testing campaign, the attacker is assumed to make progress by an iterative process in which in each iteration he selects the next node to attack, based on the group of network nodes he already controls (i.e. that are already compromised). If the attack on the selected node is successful, that node is added to the group of nodes that are already compromised, and another iteration starts. If the attempt to compromise the selected node fails, another node is selected, either according to some other rule or randomly.

It should be noted that all types of penetration testing systems, whether using simulated penetration testing, actual attack penetration testing or some other form of penetration testing, must use a lateral movement strategy. In the case of a penetration testing system that actually attacks the tested networked system, the lateral movement strategy selects the path of attack actually taken through the networked system. In the case of a penetration testing system that simulates or evaluates the results of attacking the tested networked system, the lateral movement strategy selects the path of attack taken in the simulation or the evaluation through the networked system. Therefore in the above explanation, the term "attack" should be understood to mean "actual attack or simulated attack", the term "already controls" should be understood to mean "already controls or already determined to be able to control", the term "already compromised" should be understood to mean "already compromised or already determined to be compromisable", etc.

A simple example of a lateral movement strategy is a "depth first" strategy. In such strategy, the next network node to try to compromise is an immediate neighbor of the last network node that was compromised that is not yet compromised (provided such neighbor node exists). Two network nodes are "immediate neighbors" of each other if and only if they have a direct communication link between them that does not pass through any other network node.

Another simple example is a "breadth search" strategy. In such strategy, the next network node to try to compromise is a network node whose distance from the first node compromised by the campaign is the smallest possible. The distance between two network nodes is the number of network nodes along the shortest path between them, plus one. A path is an ordered list of network nodes in which each pair of adjacent nodes in the list is a pair of immediate neighbors. Thus, the distance between two immediate neighbors is one.

An example of a more advanced lateral movement strategy is a strategy that is applicable when a goal of the attacker is related to a resource of the networked system that resides in a specific network node. In such case the next network node to try to compromise may be selected by determining the shortest path in the networked system leading from an already compromised node to the specific node containing the desired resource, and picking the first node on this path to be the next node to try to compromise. Note that if the shortest path has a length of one (which happens when the specific node is an immediate neighbor of an already compromised node), then the next node to try to compromise is the specific node containing the desired resource. Another example of a lateral movement strategy is a strategy that gives priority to network nodes satisfying a specific condition, for example nodes that are known to have a specific weakness, such as running the Windows XP operating system. In such case the next node to try to compromise is a node that satisfies the condition and is also an immediate neighbor of an already compromised node (if such node exists). Selecting a type of an attacker may cause a default selection of a lateral movement strategy for that attacker, but the user may have an option to override the default selection. An attacker can only have a single lateral movement strategy.

31. "penetration testing by simulation" or "simulated penetration testing"—Penetration testing in which (i) the functionality of the reconnaissance function is fully implemented by software executing by a remote computing device and/or by hardware and/or software simulating or duplicating the tested networked system, where the remote computing device may probe the tested networked system for the purpose of collecting data about it, as long as this is done without risking compromising the tested networked system, and (ii) the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

32. "penetration testing by actual attack" or "actual attack penetration testing" or "penetration testing by actual exploit" or "actual exploit penetration testing"—Penetration testing in which (i) the functionality of the reconnaissance function is fully implemented by (A) software executing in a remote computing device, where the remote computing device may probe the tested networked system for the purpose of collecting data about it even if this risks compromising the tested networked system, and/or by (B) software executing in one or more network nodes of the tested networked system that analyzes network traffic and network packets of the tested networked system for collecting data about it, and (ii) the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

33. "penetration testing by reconnaissance agents" or "reconnaissance agent penetration testing"—Penetration testing in which (i) the functionality of the reconnaissance function is at least partially implemented by a reconnaissance agent software module installed and executed in each one of multiple network nodes of the tested networked system, where the data collected by at least one instance of the reconnaissance agent software module includes internal data of the network node in which it is installed, and the data collected by at least one instance of the reconnaissance agent software module is at least partially collected during the penetration testing process, and (ii) the methods used by the attack function are such that whenever there is a need to verify whether a setting, a mode or a state of a network node or of a hardware or software component of a network node can be changed in a way that compromises the tested networked system, this is done by simulating the effects of the change or by otherwise evaluating them without risking compromising the tested networked system.

34. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

35. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

36. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system. The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

37. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

38. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event. It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

39. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

40. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

41. "resource of a networked system"—A file in a network node of the networked system, a folder in a network node of the networked system, credentials of a user of the networked system, a peripheral device of a network node of the networked system, or a peripheral device directly attached to a network of the networked system.

42. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

43. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

44. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

45. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

46. "session-hijacking attack"—a cyber-attack where a valid communication session between two network nodes in a networked system is used by an attacker to gain unauthorized access to information or services in the networked computer system.

47. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

48. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

49. "administrator of a network node"—Any person that is authorized, among other things, to define or change at least one rule controlling at least one of an access right, a permission, a priority and a configuration in the network node.

50. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.

51. "remote computing device" (with respect to a given networked system)—A computing device that executes software implementing part or all of the penetration testing software module that is used for testing the given networked system. A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units.

A remote computing device may be (i) a physical computing device, or (ii) a virtual machine running inside a physical computing device on top of a hosting operating system.

52. "free event of/in a network node"—An event occurring in the network node which is initiated in and by the network node and is not directly caused or triggered by an entity outside that network node. A free event of a network node may be initiated by a user of the network node, by an operating system of the network node or by an application executing on the network node. A free event of a network node may be either an internal event or a non-internal event of the network node. Examples of free events of a network node are the insertion or removal of a USB removable storage device into/from a socket of the network node, the sending of a query to a web server in response to a user manually entering the query, the sending of an ARP request message by the network node while initializing the network node after manually powering it up, and the sending of a WPAD message by the network node in response to manually typing by the user of a URL into a browser's address input box. Examples of events of a network node that are not free events are the receiving of a network message by the network node, and the sending of a network message by the network node that is done in response to receiving another network message from another network node.

53. "termination condition of a campaign", "terminating condition of a campaign", "halting condition of a campaign", "stopping condition of a campaign", "termination criterion of a campaign", "terminating criterion of a campaign", "halting criterion of a campaign", or "stopping criterion of a campaign"—A Boolean condition defined for the campaign that if and when satisfied causes the halting of the campaign, even if the goal of the attacker of the campaign was not yet reached.

For the sake of the above defined terms the singular and plural forms are equivalent—"criterion" and "criteria" are used interchangeably, and so are "condition" and "conditions".

The condition may be a simple condition (for example "the number of already compromised nodes in the tested networked system is five or more") or a compound condition composed of multiple simple conditions and one or more logical operators (for example "a file named company_budget.xls is exported out of the tested networked system from any network node, or at least ten files were encrypted by the attacker in the network node used by the organization's CFO"). A halting condition of a campaign can be defined for all types of penetration testing systems. For an actual attack penetration testing system, the halting condition is typically associated with the state or status of the tested networked system. For penetration testing systems that do not attempt to compromise the tested networked system, the halting condition is typically associated with a state or status of a simulation of the networked system or may be evaluated based on such state or status. However, the above is not limiting in any way, and the halting condition may depend on any factor that is available to the penetration testing system during the campaign, including on factors that are independent of the state and the status of the campaign, for example on the amount of time spent on running the campaign or on the time of day. A halting condition may be either a direct halting condition or an indirect halting condition.

54. "damaging a file"—Changing the file in a way that the file cannot be recovered to its original form without having extra information. Examples of specific ways of damaging a file are (i) deleting the file, (ii) removing the first 100 bytes of the file, (iii) changing the order of bytes in the file (without removing any of them), (iv) encrypting the file using a secret key, etc.

Note that changing the access rights of a file is not considered damaging the file.

55. "explicitly selecting"—Directly and clearly selecting, by a human user, of one option out of multiple options available to human user, leaving no room for doubt and not relying on making deductions by a computing device.

Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item. Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.

56. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities. An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.

57. "defensive application"—A software application whose task is to defend the network node in which it is installed against potential attackers. A defensive application may be a passive defensive application, in which case it only detects and reports penetration attempts into its hosting network node but does not attempt to defend against the detected attacks. Alternatively, a defensive application may be an active defensive application, in which case it not only detects penetration attempts into its hosting network node but also attempts to defend its hosting node against the detected attacks by activating at least one counter-measure.

58. "macro language"—A programming language which is embedded inside a software application (e.g., inside a word processor or a spreadsheet application). A software application in which a macro language is embedded is said "to support the macro language", and is a "macro-supporting software application".

59. "macro"—A sequence of commands written in a macro language.

60. "auto-executing macro"—A macro that is embedded inside a given file, is written in a macro language that is embedded inside a given software application, and is automatically executed whenever the given file is opened by the given software application. A file in which an auto-executing macro is embedded is said "to contain the auto-executing macro".

61. "macro-based security vulnerability" or "macro-based vulnerability"—A security vulnerability of a network node which requires execution of an auto-executing macro in the network node in order to cause the network node to become compromised.

62. "macro-based attack"—An attack of a network node attempting to exploit a macro-based security vulnerability.

63. "selecting a link"—Making an operation by a user that causes following the link to a destination pointed to by the link. Typically, selecting a link is achieved by pointing a visible cursor to the link and clicking a button on a pointing device (e.g. a mouse). However, there are other ways of selecting a link, for example by moving a selection indicator until the link is marked as selected and then hitting a selection button (e.g. an "Enter" button in a keyboard or an "OK" button in a remote-control device).

64. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device. In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

65. "user interface of a computing device"—A user interface that is functionally attached to the computing device and serves the computing device for interacting with the user. An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse). An output device of a user interface of a computing device may share a common housing with the computing device (e.g. a touch-screen of a tablet), or may be physically separate from the computing device and be in communication with it, either through a physical port (e.g. an HDMI port) or wirelessly. User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

66. "random selection"—A selection that depends on a random or pseudo-random factor. Different possible outcomes in a random selection do not necessarily have the same probabilities to be selected.

67. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

CONCLUDING COMMENT

All references cited herein are incorporated by reference in their entirety. Citation of a reference does not constitute an admission that the reference is prior art.

It is further noted that any of the embodiments described above may further include receiving, sending or storing instructions and/or data that implement the operations described above in conjunction with the figures upon a computer readable medium. Generally speaking, a computer readable medium (e.g. non-transitory medium) may include storage media or memory media such as magnetic or flash or optical media, e.g. disk or CD-ROM, volatile or non-volatile media such as RAM, ROM, etc.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A method for executing a penetration test of a networked system by a penetration testing system so as to determine a method for an attacker to compromise the networked system, where the penetration testing system comprises (A) a penetration testing software module installed on a remote computing device and (B) a reconnaissance agent software module (RASM) installed on at least some network nodes of the networked system so that each network node of the networked system on which the RASM is installed is defined as a RASM-hosting network node, the method for executing the penetration test comprising:

a. obtaining, by each given RASM-hosting network node of one or more RASM-hosting network nodes, respective data of the given RASM-hosting network node, the obtaining comprising executing computer code of the RASM by one or more processors of the given RASM-hosting network node, the respective data including data about at least one member selected from the group consisting of:
      A. an event of the given RASM-hosting network node,
      B. a condition of the given RASM-hosting network node, and
      C. a fact of the given RASM-hosting network node;
   b. transmitting to the remote computing device, by each given RASM-hosting network node of the one or more RASM-hosting network nodes, the obtained respective data of the given RASM-hosting network node, the transmitting comprising executing computer code of the RASM by the one or more processors of the given RASM-hosting network node;
   c. assessing, by the remote computing device, and based on the data transmitted by at least one RASM-hosting network node of the one or more RASM-hosting network nodes, if a first network node of the networked system can be compromised;
   d. in response to assessing that the first network node of the networked system can be compromised, simulating or evaluating, by the remote computing device, a result of compromising the first network node of the networked system;
   e. determining, by the remote computing device and based on the result of the compromising of the first network node of the networked system, that a second network node of the networked system can be compromised, wherein the determining that the second network node of the networked system can be compromised comprises (i) using knowledge about known methods of compromising networks or computing devices, and (ii) executing computer code of the penetration testing software module by one or more processors of the remote computing device;

f. determining, by the remote computing device and based on the determining that the second network node of the networked system can be compromised, the method for the attacker to compromise the networked system; and g. reporting, by the remote computing device of the penetration testing system, the determined method for the attacker to compromise the networked system, the reporting comprising executing computer code of the penetration testing software module by the one or more processors of the remote computing device, wherein the reporting comprises at least one operation selected from the group consisting of (i) causing a display device to display a report including information about the determined method for the attacker to compromise the networked system, (ii) recording the report including the information about the determined method for the attacker to compromise the networked system in a file, and (iii) electronically transmitting the report including the information about the determined method for the attacker to compromise the networked system, wherein the method for executing the penetration test is such that no network node of the networked system is put at risk of being compromised by the executing of the penetration test.

2. The method of claim 1, wherein the RASM is installed on at least one of the one or more RASM-hosting network nodes prior to beginning the executing of the penetration test.

3. The method of claim 1, wherein the RASM is installed on all of the one or more RASM-hosting network nodes prior to beginning the executing of the penetration test.

4. The method of claim 1, wherein the information about the determined method for an attacker to compromise the networked system comprises at least one member selected from the group consisting of: (i) information about a method for compromising one network node of the networked system (ii) information about one or more network nodes of the networked system which are vulnerable to attack, (iii) information about one or more resources of the networked system that could be damaged or exported out of the networked system by an attacker, and (iv) information about an ordered list of network nodes of the networked system, wherein an attacker could use a specific network node in said ordered list that is already compromised as a basis for compromising another network node that immediately follows said specific network node in said ordered list.

5. The method of claim 1, wherein for at least one specific RASM-hosting network node of the one or more RASM-hosting network nodes, the obtained respective data of the specific RASM-hosting network node comprises internal data of the specific RASM-hosting network node.

6. The method of claim 1, wherein at least one RASM-hosting network node of the one or more RASM-hosting network nodes performs at least one step selected from the group consisting of step (a) and step (b) in response to a receiving of one or more data-requesting commands from the remote computing device.

7. The method of claim 1, wherein each RASM-hosting network node of the one or more RASM-hosting network nodes performs at least one step selected from the group consisting of step (a) and step (b) in response to a receiving of one or more data-requesting commands from the remote computing device.

8. The method of claim 1, wherein all of the assessing that the first network node of the networked system can be compromised is performed by the remote computing device.

9. The method of claim 1, wherein the using of knowledge about known methods of compromising networks or computing devices comprises using one or more databases that store the knowledge about known methods of compromising networks or computing devices.

10. A penetration testing system for executing a penetration test of a networked system so as to determine a method for an attacker to compromise the networked system, the penetration testing system comprising:

a. a remote computing device comprising a computer memory and one or more processors, the remote computing device in electronic communication with the networked system;

b. a first non-transitory computer-readable storage medium containing first code of a reconnaissance agent software module (RASM), wherein execution of the first code of the RASM by respective one or more processors of each given network node of a first set of network nodes of the networked system, causes the one or more processors of the given network node of the first set to carry out the following:

i. obtaining respective data of the given network node of the first set, the respective data including data about at least one member selected from the group consisting of:
A. an event of the given network node of the first set,
B. a condition of the given network node of the first set, and
C. a fact of the given network node of the first set; and ii. transmitting to the remote computing device and out of the given network node of the first set the obtained respective data of the given network node of the first set; and c. a second non-transitory computer-readable storage medium containing second code of a penetration testing software module, wherein execution of the second code of the penetration testing software module by the one or more processors of the remote computing device:

i. assesses, based on the respective data transmitted by each given network node of a second set of network-nodes of the networked system, if a first network node of the networked system can be compromised;

ii. in response to assessing that the first network node can be compromised, simulates or evaluates a result of compromising the first network node of the networked system;

iii. determines, based on the result of the compromising of the first network node of the networked system, that a second network node of the networked system can be compromised, wherein the determining that the second network node of the networked system can be compromised comprises using knowledge about known methods of compromising networks or computing devices;

iv. determines, based on the determining that the second network node of the networked system can be compromised, the method for the attacker to compromise the networked system; and v. reports the determined method for the attacker to compromise the networked system, wherein the reporting comprises at least one operation selected from the group consisting of (A) causing a display device to display a report including information about the determined method for the attacker to compromise the networked system, (B) recording the report including the information about the determined method for the attacker to compromise the networked system in a file, and (C) electronically transmitting a report including the information about the determined method for the attacker to compromise the networked system, wherein (i) the execution of the first code of the RASM by the respective one or more processors of each given network node of the first set of network nodes of the networked system and (ii) the execution of the second code of the penetration testing software module by the one or more processors of the remote computing device, subject the networked system to penetration testing in which no network node of the networked system is put at risk of being compromised.

11. A method for executing a penetration test of a networked system by a penetration testing system so as to determine a method for an attacker to compromise the networked system, where the penetration testing system comprises (A) a penetration testing software module installed on a remote computing device and (B) a reconnaissance agent software module (RASM) installable on network nodes of the networked system so that each network node of the networked system on which the RASM is installed is defined as a RASM-hosting network node, the method for executing the penetration test comprising:

a. subsequent to an installing of the RASM on at least some network nodes of the networked system, which installing occurs prior to starting the executing of the penetration test, performing the following:
  i. obtaining, by each given RASM-hosting network node of one or more RASM-hosting network nodes, respective data of the given RASM-hosting network node, the obtaining comprising executing computer code of the RASM by one or more processors of the given RASM-hosting network node, the respective data including data about at least one member selected from the group consisting of:
    A. an event of the given RASM-hosting network node,
    B. a condition of the given RASM-hosting network node, and
    C. a fact of the given RASM-hosting network node; and
  ii. transmitting to the remote computing device, by each given RASM-hosting network node of the one or more RASM-hosting network nodes, the obtained respective data of the given RASM-hosting network node, the transmitting comprising executing computer code of the RASM by the one or more processors of the given RASM-hosting network node;
c. assessing, by the remote computing device and based on the data transmitted by at least one RASM-hosting network node of the one or more RASM-hosting network nodes, of a first network node of the networked system can be compromised;
d. in response to assessing that the first network node of the networked system can be compromised, simulating or evaluating, by the remote computing device, a result of compromising the first network node of the networked system;
e. determining, by the remote computing device and based on the result of the compromising of the first network node of the networked system, that a second network node of the networked system can be compromised, wherein the determining that the second network node of the networked system can be comprosmised comprises (i) using knowledge about known methods compromising networks or computing devices, and (ii) executing computer code of the penetration testing software module by one or more processors of the remote computing device;
f. determining, by the remote computing device and based on the determining that the second network node of the networked system can be compromised, the method for the attacker to compromise the networked system; and
g. reporting, by the remote computing device of the penetration testing system, the method for the attacker to compromise the networked system, the reporting comprising executing computer code of the penetration testing software module by the one or more processors of the remote computing device, wherein the reporting comprises at least one operation selected from the group consisting of (i) causing a display device to display a report including information about the determined method for the attacker to compromise the networked system, (ii) recording the report including the information about the determined method for the attacker to compromise the networked system in a file, and (iii) electronically transmitting the report including the information about the determined method for the attacker to compromise the networked system.

12. The method of claim 11, further comprising the step of:
d. before commencing step (a), installing the RASM on the at least some network nodes of the networked system.

13. The method of claim 11, wherein the information about the determined method for an attacker to compromise the networked system comprises at least one member selected from the group consisting of: (i) information about a method for compromising one network node of the networked system (ii) information about one or more network nodes of the networked system which are vulnerable to attack, (iii) information about one or more resources of the networked system that could be damaged or exported out of the networked system by an attacker, and (iv) information about an ordered list of network nodes of the networked system, wherein an attacker could use a specific network node in said ordered list that is already compromised as a basis for compromising another network node that immediately follows said specific network node in said ordered list.

14. The method of claim 11, wherein for at least one specific RASM-hosting network node of the one or more RASM-hosting network nodes, the obtained respective data of the specific RASM-hosting network node comprises internal data of the specific RASM-hosting network node.

15. The method of claim 11, wherein at least one RASM-hosting network node of the one or more RASM-hosting network nodes performs at least one step selected from the group consisting of step a(i) and step a(ii) in response to a receiving of one or more data-requesting commands from the remote computing device.

16. The method of claim 11, wherein all of the assessing that the first network node of the networked system can be compromised is performed by the remote computing device.

17. The method of claim 11, wherein the using of the knowledge about known methods of compromising networks or computing devices comprises using one or more databases that store the knowledge about known methods of compromising networks or computing devices.

18. The method of claim 11, wherein the method for executing the penetration test is performed so that no network node of the networked system is put at risk of being compromised by the executing of the penetration test.

19. The method of claim 11, wherein the RASM is installed on all of the one or more RASM-hosting network nodes prior to beginning the executing of the penetration test.

20. A penetration testing system for executing a penetration test of a networked system so as to determine a method for an attacker to compromise the networked system, the penetration testing system comprising:
  a. a remote computing device comprising a computer memory and one or more processors, the remote computing device in electronic communication with the networked system;
  b. a first non-transitory computer-readable storage medium containing first code of a reconnaissance agent software module (RASM), wherein for a first set of network-nodes of the networked system on which the RASM is pre-installed before starting the executing of the penetration test, subsequent execution of the first code, after starting the executing of the penetration test, by respective one or more processors of each given network node of the first set of network nodes, causes the one or more processors of the given network node of the first set to carry out the following:
    i. obtaining respective data of the given network node of the first set, the respective data including data about at least one member selected from the group consisting of:
      A. an event of the given network node of the first set,
      B. a condition of the given network node of the first set, and
      C. a fact of the given network node of the first set; and
    ii. transmitting to the remote computing device and out of the given network node of the first set the obtained respective data of the given network node of the first set; and
  c. a second non-transitory computer-readable storage medium containing second code of a penetration testing software module, wherein execution of the second code of the penetration testing software module by the one or more processors of the remote computing device:
    i. assesses, based on the respective data transmitted by each given network node of a second set of network-nodes of the networked system, if a first network node of the networked system can be compromised;
    ii. in response to assessing that the first network node can be compromised, simulates or evaluates a result of compromising the first network node of the networked system;
    iii. determines, based on the result of the compromising of the first network node of the networked system, that a second network node of the networked system can be compromised, wherein the determining that the second network node of the networked system can be compromised comprises using knowledge about known methods of compromising networks or computing devices;
    iv. determines, based on the determining that the second network node of the networked system can be compromised, the method for the attacker to compromise the networked system; and
    v. reports the determined method for the attacker to compromise the networked system, wherein the reporting comprises at least one operation selected from the group consisting of (A) causing a display device to display a report including information about the determined method for the attacker to compromise the networked system, (B) recording the report including the information about the determined method for the attacker to compromise the networked system in a file, and (C) electronically transmitting a report including the information about the determined method for the attacker to compromise the networked system.

* * * * *

UNITED STATES PATENT AND TRADEMARK OFFICE
CERTIFICATE OF CORRECTION

PATENT NO. : 10,637,882 B2
APPLICATION NO. : 15/874429
DATED : April 28, 2020
INVENTOR(S) : Boaz Gorodissky, Adi Ashkenazy and Ronen Segal Page 1 of 1

It is certified that error appears in the above-identified patent and that said Letters Patent is hereby corrected as shown below:

In the Claims

Column 55 Line 54, Claim 11:
Delete the phrase "of a first network node of the" and replace with --if a first network node of the--.

Column 55 Line 66, Claim 11:
Delete the phrase "system can be comprosmised" and replace with --system can be compromised--.

Column 55 Line 67, Claim 11:
Delete the phrase "knowledge about known methods" and replace with --knowledge about known methods of--.

Signed and Sealed this
Second Day of June, 2020

Andrei Iancu
*Director of the United States Patent and Trademark Office*